United States Patent [19]

Suzuki et al.

[11] Patent Number: 5,801,709
[45] Date of Patent: Sep. 1, 1998

[54] 3-DIMENSIONAL DATA SHAPING APPARATUS

[75] Inventors: Hironobu Suzuki, Yokohama; Michio Miwa; Hiroyuki Hikita, both of Tokyo; Toru Kawaguchi, Matsudo; Noritoshi Ogasawara, Tokyo, all of Japan

[73] Assignee: Matsushita Electric Industrial Co., Ltd., Osaka, Japan

[21] Appl. No.: 492,348

[22] Filed: Jun. 19, 1995

[30] Foreign Application Priority Data

Sep. 27, 1994 [JP] Japan .................... 6-256036

[51] Int. Cl.$^6$ .................................... G06T 17/40
[52] U.S. Cl. ............... 345/433; 364/474.24; 345/424
[58] Field of Search .................... 395/127, 124, 395/134, 135, 133; 364/474.2, 474.24

[56] References Cited

U.S. PATENT DOCUMENTS 5,371,514  12/1994  Lawless et al. ............. 395/135 X
5,432,894  7/1995   Funaki et al. .............. 395/134 X
5,471,569  11/1995  Katoh ...................... 395/134
5,497,453  3/1996   Megahed et al. ............ 395/124 X Primary Examiner—Mark K. Zimmerman
Attorney, Agent, or Firm—Lowe, Price, LeBlanc & Becker

[57] ABSTRACT

A three-dimensional data shaping apparatus defines a working region, as a region of specific size and shape within a reference three-dimensional space, with a corresponding display picture being generated. A user can move the working region, using an input device such as a mouse, to select a specific part of a work object that is represented by a set of constituent data elements within the reference space, and execute shaping of the selected part. Determination of a selected part is performed in two judgement stages, i.e. a first stage in which a judgement is made as to interference between the working region and a number of fixed-size small regions into which the three-dimensional space is considered to be divided, and a second stage in which a judgement is made as to interference between the working region and only those constituent elements of the work object which correspond, according to predetermined criteria, with those of the small spaces for which interference has been found in the first judgement stage.

21 Claims, 26 Drawing Sheets

FIG. 3A
CELL TABLE 21

| C.no | C.num | C.flag | C.adr | C.x | C.y | C.z | C.r |
|---|---|---|---|---|---|---|---|
| 1 | K-1 | OFF | 1 | | | | |
| 2 | L-K | OFF | K | | | | |
| : | : | : | : | : | : | : | : |
| 8 | | OFF | M | | | | |

FIG. 3B
POLYGON TABLE 22

| P.no | P.v1 | P.v2 | P.v3 | P.tx | P.ty | P.tz |
|---|---|---|---|---|---|---|
| 1 | 1 | 2 | 3 | 0.0 | 0.0 | 1.0 |
| : | : | : | : | : | : | : |
| K-1 | : | : | : | : | : | : |
| K | : | : | : | : | : | : |
| : | : | : | : | : | : | : |
| L-1 | : | : | : | : | : | : |
| : | : | : | : | : | : | : |
| M | : | : | : | : | : | : |
| : | : | : | : | : | : | : |

FIG. 3C
VERTEX TABLE 23

| V.no | V.x | V.y | V.z | V.flag |
|---|---|---|---|---|
| 1 | 0.0 | 0.0 | 0.0 | OFF |
| 2 | 1.0 | 0.0 | 0.0 | OFF |
| 3 | 0.0 | 1.0 | 0.0 | OFF |
| : | : | : | : | : |
| Vmax | 1.0 | 1.0 | 1.0 | OFF |

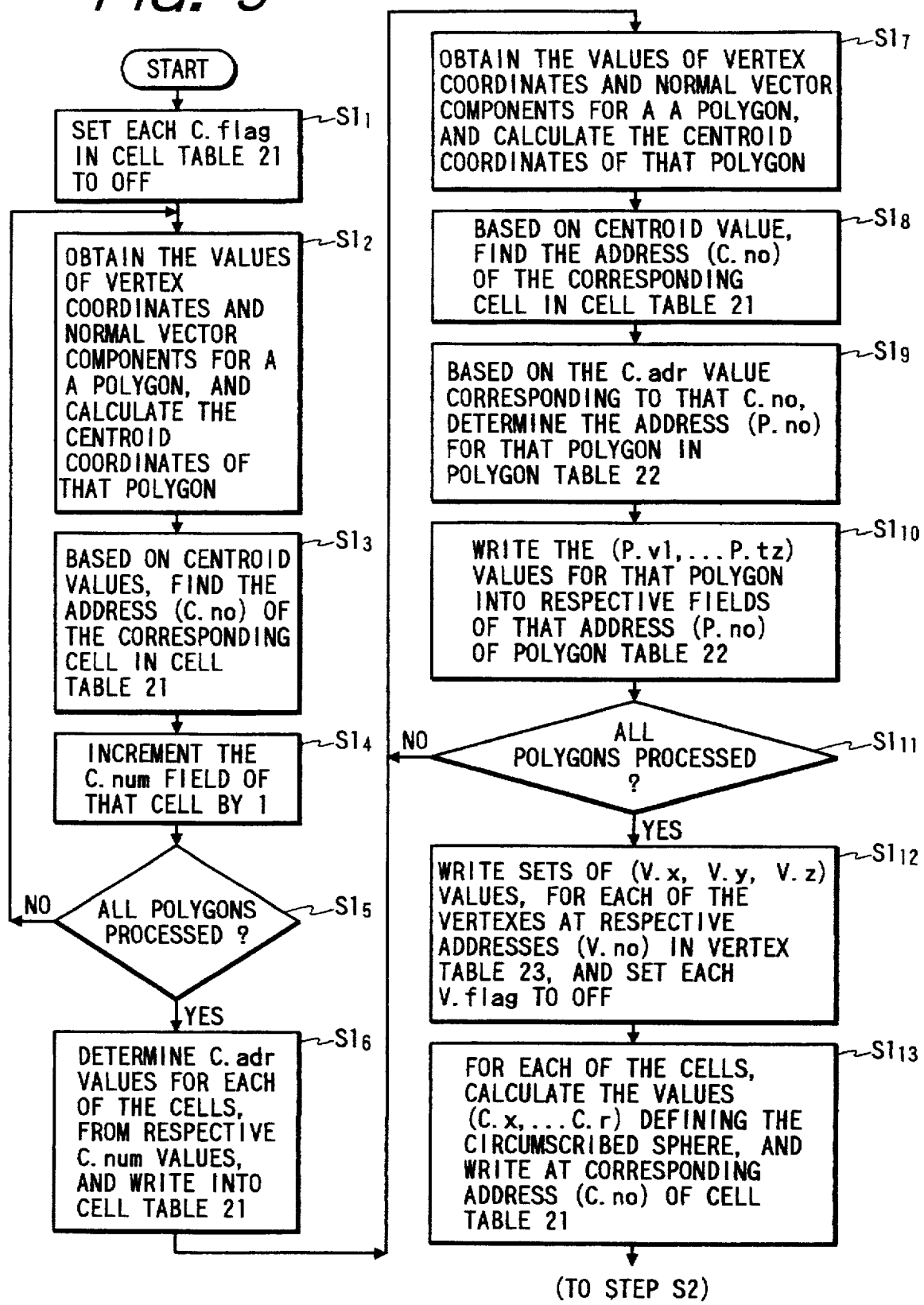

FIG. 16A  CELL TABLE 21

| C.no | C.num | C.flag | C.adr | C.x | C.y | C.z | C.r |
|------|-------|--------|-------|-----|-----|-----|-----|
| 1 | K-1 | OFF | 1 | | | | |
| 2 | L-K | OFF | K | | | | |
| ⋮ | ⋮ | ⋮ | ⋮ | ⋮ | ⋮ | ⋮ | ⋮ |
| 8 | | OFF | M | | | | |

FIG. 16B  POLYGON TABLE 22

| P.no | P.v1 | P.v2 | P.v3 | P.tx | P.ty | P.tz | P.flag |
|------|------|------|------|------|------|------|--------|
| 1 | 1 | 2 | 3 | 0.0 | 0.0 | 1.0 | OFF |
| ⋮ | ⋮ | ⋮ | ⋮ | ⋮ | ⋮ | ⋮ | ⋮ |
| K-1 | ⋮ | ⋮ | ⋮ | ⋮ | ⋮ | ⋮ | ⋮ |
| K | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| L-1 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| M | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG. 16C  VERTEX TABLE 23

| V.no | V.x | V.y | V.z | V.flag |
|------|-----|-----|-----|--------|
| 1 | 0.0 | 0.0 | 0.0 | OFF |
| 2 | 1.0 | 0.0 | 0.0 | OFF |
| 3 | 0.0 | 1.0 | 0.0 | OFF |
| ⋮ | ⋮ | ⋮ | ⋮ | ⋮ |
| Vmax | 1.0 | 1.0 | 1.0 | OFF |

FIG. 20A
CELL TABLE 25

| C.no | C.num | C.flag | C.adr | C.x | C.y | C.z | C.r | C.ranflag |
|---|---|---|---|---|---|---|---|---|
| 1 | K-1 | OFF | 1 | | | | | OFF |
| 2 | L-K | OFF | K | | | | | OFF |
| ⋮ | ⋮ | ⋮ | ⋮ | ⋮ | ⋮ | ⋮ | ⋮ | ⋮ |
| 8 | | OFF | M | | | | | |

FIG. 20B
POLYGON TABLE 22

| P.no | P.v1 | P.v2 | P.v3 | P.tx | P.ty | P.tz |
|---|---|---|---|---|---|---|
| 1 | 1 | 2 | 3 | 0.0 | 0.0 | 1.0 |
| ⋮ | ⋮ | ⋮ | ⋮ | ⋮ | ⋮ | ⋮ |
| K-1 | | | | | | |
| K | | | | | | |
| ⋮ | ⋮ | ⋮ | ⋮ | ⋮ | ⋮ | ⋮ |
| L-1 | | | | | | |
| ⋮ | ⋮ | ⋮ | ⋮ | ⋮ | ⋮ | ⋮ |
| M | | | | | | |
| ⋮ | ⋮ | ⋮ | ⋮ | ⋮ | ⋮ | ⋮ |

FIG. 20C
VERTEX TABLE 23

| V.no | V.x | V.y | V.z | V.flag |
|---|---|---|---|---|
| 1 | 0.0 | 0.0 | 0.0 | OFF |
| 2 | 1.0 | 0.0 | 0.0 | OFF |
| 3 | 0.0 | 1.0 | 0.0 | OFF |
| ⋮ | ⋮ | ⋮ | ⋮ | ⋮ |
| Vmax | 1.0 | 1.0 | 1.0 | OFF |

FIG. 25A1  CELL TABLE 26

| Cl.no | Cl.num | Cl.flag | Cl.adr | Cl.x | Cl.y | Cl.z | Cl.r |
|---|---|---|---|---|---|---|---|
| 1 | K-1 | OFF | 1 | | | | |
| 2 | L-K | OFF | K | | | | |
| ⋮ | ⋮ | ⋮ | ⋮ | ⋮ | ⋮ | ⋮ | ⋮ |
| 8 | | OFF | M | | | | |

FIG. 25A2  POLYGON TABLE 27

| Pl.no | Pl.v1 | Pl.v2 | Pl.v3 | Pl.tx | Pl.ty | Pl.tz |
|---|---|---|---|---|---|---|
| 1 | 1 | 2 | 3 | 0.0 | 0.0 | 1.0 |
| ⋮ | ⋮ | ⋮ | ⋮ | ⋮ | ⋮ | ⋮ |
| K-1 | ⋮ | ⋮ | ⋮ | ⋮ | ⋮ | ⋮ |
| K | ⋮ | ⋮ | ⋮ | ⋮ | ⋮ | ⋮ |
| ⋮ | ⋮ | ⋮ | ⋮ | ⋮ | ⋮ | ⋮ |
| L-1 | ⋮ | ⋮ | ⋮ | ⋮ | ⋮ | ⋮ |
| ⋮ | ⋮ | ⋮ | ⋮ | ⋮ | ⋮ | ⋮ |
| M | ⋮ | ⋮ | ⋮ | ⋮ | ⋮ | ⋮ |

FIG. 25A3  VERTEX TABLE 28

| Vl.no | Vl.x | Vl.y | Vl.z | Vl.flag |
|---|---|---|---|---|
| 1 | 0.0 | 0.0 | 0.0 | OFF |
| 2 | 1.0 | 0.0 | 0.0 | OFF |
| 3 | 0.0 | 1.0 | 0.0 | OFF |
| ⋮ | ⋮ | ⋮ | ⋮ | ⋮ |
| Vmax | 1.0 | 1.0 | 1.0 | OFF |

FIG. 25B1  CELL TABLE 29

| C2.no | C2.num | C2.flag | C2.adr | C2.x | C2.y | C2.z | C2.r |
|---|---|---|---|---|---|---|---|
| 1 | K-1 | OFF | 1 | | | | |
| 2 | L-K | OFF | K | | | | |
| ⋮ | ⋮ | ⋮ | ⋮ | ⋮ | ⋮ | ⋮ | ⋮ |
| 8 | | OFF | M | | | | |

FIG. 25B2  POLYGON TABLE 30

| P2.no | P2.v1 | P2.v2 | P2.v3 | P2.tx | P2.ty | P2.tz |
|---|---|---|---|---|---|---|
| 1 | 1 | 2 | 3 | 0.0 | 0.0 | 1.0 |
| ⋮ | ⋮ | ⋮ | ⋮ | ⋮ | ⋮ | ⋮ |
| K-1 | ⋮ | ⋮ | ⋮ | ⋮ | ⋮ | ⋮ |
| K | ⋮ | ⋮ | ⋮ | ⋮ | ⋮ | ⋮ |
| ⋮ | ⋮ | ⋮ | ⋮ | ⋮ | ⋮ | ⋮ |
| L-1 | ⋮ | ⋮ | ⋮ | ⋮ | ⋮ | ⋮ |
| ⋮ | ⋮ | ⋮ | ⋮ | ⋮ | ⋮ | ⋮ |
| M | ⋮ | ⋮ | ⋮ | ⋮ | ⋮ | ⋮ |
| ⋮ | ⋮ | ⋮ | ⋮ | ⋮ | ⋮ | ⋮ |

FIG. 25B3  VERTEX TABLE 31

| V2.no | V2.x | V2.y | V2.z | V2.flag |
|---|---|---|---|---|
| 1 | 0.0 | 0.0 | 0.0 | OFF |
| 2 | 1.0 | 0.0 | 0.0 | OFF |
| 3 | 0.0 | 1.0 | 0.0 | OFF |
| ⋮ | ⋮ | ⋮ | ⋮ | ⋮ |
| Vmax | 1.0 | 1.0 | 1.0 | OFF |

3-DIMENSIONAL DATA SHAPING APPARATUS

BACKGROUND OF THE INVENTION

1. Field of the Invention

The present invention relates to an apparatus for processing data which represent the shape of a three-dimensional object, to execute changes in the shape of the represented object, and which can execute such changes in real time, in response to input operations.

2. Description of Prior Art

In the following, data representing the shape of an object as a set of constituent elements within a reference three-dimensional space will be referred to as three-dimensional shape data, and the represented object referred to as the work object.

There is a commonly used type of CAE (computer aided engineering) whereby the surface shape of a three-dimensional object is measured by electro-optical means, such as a laser beam scanning system, to obtain resultant three-dimensional shape data representing the object. Specifically, the respective positions of a large number of points on the surface of the object are measured, in relation to a predetermined three-dimensional coordinate system. The resultant measured values constitute the three-dimensional shape data. The three-dimensional shape data generated in such CAE can be used as a basis for directly manufacturing various types of article. As one example, a hearing device can be manufactured as follows. The ear aperture of the individual who will use the hearing device is first filled with a silicone material, to thereby obtain a mold of the ear interior. Three-dimensional scanning of that mold is then performed, to obtain three-dimensional shape data which represent the interior shape of the ear of the prospective user. The three-dimensional shape data can then be suitably modified to obtain data which represent a shape for a hearing device which will be appropriate for the ear aperture. In that way, a hearing device can be produced which is accurately matched to the shape of the ear interior of a specific user.

In general, a high level of accuracy is required, so that a large number of measurement points must be used in deriving the three-dimensional shape data. Typically, more than 10,000 measurement points may be utilized.

In other cases, the work object may be a test model, i.e. a mock-up, whose shape is converted to three-dimensional data and is then modified to obtain the shape of an article which will be mass-manufactured. It should be understood that the phrase "changing the shape" of an object, as used herein, has a broad significance which covers various types of operation such as bending of particular parts of the object, forming of apertures, forming of indented regions, forming of outwardly protruding regions, etc. Various proposals have been made in the prior art for an apparatus to perform such shape changing, by operating on three-dimensional shape data. With such an apparatus, the three-dimensional shape data represent the work object as a set of constituent elements, which in general are polygons. Shape changing is executed by inputting values (e.g. through a keyboard) to a data processing system which operates on the three-dimensional shape data to alter appropriate polygons. Such input values can specify, for example, changes in position of specific apexes of polygons within the three-dimensional shape data. It is also possible to use an input device such as a mouse, in conjunction with a display terminal which provides a picture of the work object, so that the user can directly specify particular polygons and polygon apexes which are to be shifted in position, to effect desired changes in shape.

In the case of a prior art three-dimensional data shaping apparatus in which input values are supplied by a user via a keyboard, it is necessary for the user to spend a great deal of time and effort on performing such data input operations, in order to effect desired changes in the shape of the work object as represented by the three-dimensional shape data. It would be desirable for the user to be able to perform such shape changes by real-time input operations, and to be able to immediately confirm the results of such input operations by observing a real-time display picture However that has been difficult to achieve.

On the other hand, in the case of a type of three-dimensional data shaping apparatus whereby the user uses an input device such as a mouse to directly input data which specify the constituent elements (e.g. polygons and polygon apexes) of the three-dimensional shape data which are to be operated on such as to obtain a desired change in shape of the represented object, then each time such an input operation is performed, it is necessary for the apparatus to perform interference judgements between all of the polygons of the three-dimensional shape data and the data which have been supplied from the input device. The term "interference" between two regions, as used in the following description and in the appended claims, signifies a condition whereby the two regions mutually overlap, at least partially, within a three-dimensional space. The number of polygons can exceed several tens of thousands, so that a large number of calculations must be performed, so that the processing speed is slow, and hence it becomes difficult to effect the shape changes by real-time operation.

Moreover with a prior art type of three-dimensional data shaping apparatus, respectively different types of input operation methods must be used by the user, to perform respectively different types of shape-changing operations on the represented object. That is to say, it has not been possible to provide a unified interface between the user and the three-dimensional data shaping apparatus, which will be common to various different types of shape-changing operations. With a typical prior art type of three-dimensional data shaping apparatus, for example, an arbitrary part of the object represented by the three-dimensional shape data can be moved outward from the body of the object, i.e. to produce upward protrusion of a particular region, or an arbitrary part of the represented object can be moved inward, i.e. to recess a particular region. It can be understood that these two types of operation are essentially similar, but differ only in the direction in which a change is made. In principle therefore, it should be possible for the user to make such changes by using a common input operating method. However in general with a prior art type of three-dimensional data shaping apparatus, a unified input operating method is not provided for such types of shape changing, i.e. a common input interface is not provided, so that it has been necessary for the user to change to a different type of input interface each time that a change to a different type of shaping operation is to be made, and the user must in each case operate the apparatus in accordance with the particular type of input interface. For example, when a compression operation is to be performed, a picture of a press machine may be displayed, and the user must perform the shaping by operations which are analogous to those performed when using an actual industrial press machine. In the case of forming a hole in the represented object, a picture of a drilling machine may be displayed, and the user must then perform input operations that are analogous to those performed when using an actual physical drilling machine.

Thus it is necessary to use two completely different types of input interface for these two types of shaping operation, i.e. an input interface corresponding to a press machine and an interface corresponding to a drilling machine, in spite of the fact that these shaping operations are basically identical in nature. The user must therefore learn to adapt to such special requirements of such a three-dimensional shaping apparatus, which is difficult to operate.

Moreover, with a prior art type of three-dimensional data shaping apparatus, after making changes in the object shape represented by the three-dimensional shape data, it has not been possible to compare the changed shape with the initial shape. For example in the case of producing a hearing device, after deriving three-dimensional shape data representing the interior of the prospective user's ear, shaping operations can then be performed on the three-dimensional shape data to obtain three-dimensional data which represent the appropriate shape of the exterior of the hearing device. However if the mold three-dimensional shape data (representing the interior of the ear) cannot be directly compared on the display screen with the new three-dimensional shape data that represents the proposed shape of the exterior of the hearing device, then it becomes difficult to achieve a satisfactory final product. With prior art types of three-dimensional data shaping apparatus, no method has been available for mutually superimposing the three-dimensional mold data and the three-dimensional data representing the proposed object shape that is to be formed by using the mold, so that positions of interference between these can be judged. Hence it has not been possible to accurately decide whether the finally obtained three-dimensional shape data can actually be utilized.

If it were to be attempted to judge such interference between the two sets of three-dimensional shape data, with a prior art type of three-dimensional data shaping apparatus, then due to the very large number of data values which are involved, the amount of calculations required to judge the interference would be extremely large. Hence it would not be possible to execute such calculations within a practicable time, so that it would not be possible to show the effects of shape changes in a real-time display picture.

SUMMARY OF THE INVENTION

It is an objective of the present invention to overcome the problems of the prior art set out above, by providing a three-dimensional shaping apparatus having a sufficiently high speed of operation whereby the effects of shape change operations performed by a user on three-dimensional shape data can be confirmed by a real-time display picture.

It is a further objective of the invention to provide a three-dimensional data shaping apparatus whereby various different types of shape changing operations on an object represented by three-dimensional shape data can be performed using the same operating interface, thereby ensuring that the apparatus is simple to operate.

It is a further objective of the invention to provide a three-dimensional data shaping apparatus whereby a user can rapidly evaluate the effects of shape changing operations that are being performed on an object represented by three-dimensional shape data.

To achieve the above objectives, the invention provides a three-dimensional data shaping apparatus comprising means for defining a working region, as a region of specific size and shape within a reference three-dimensional space. The apparatus further includes means whereby a user can vary the position of the working region such as to select a specific part of a work object that is represented as a set of constituent elements by three-dimensional shape data within that reference space, by setting that part of the work object within the working region. Shaping of the selected part can then be executed by selecting one of a number of predetermined mathematical functions as a shaping function. Selection of the required part of the work object is performed in two stages, i.e. a first stage in which a judgement is made as to interference between the working region and a number of fixed-size small regions into which the three-dimensional space is considered to be divided, and a second stage in which a judgement is made as to interference between the working region and only those constituent elements of the work object which correspond (according to predetermined criteria) with those ones of the small spaces for which interference has been found in the first judgement stage.

More specifically, the invention provides a three-dimensional data shaping apparatus for processing three-dimensional shape data which represent a shape of an object in relation to a reference three-dimensional space, to execute a predetermined shaping operation, the three-dimensional shape data representing the shape as a plurality of constituent elements, the apparatus comprising:

input means for generating working region position data, operable for controllably varying the working region position data;

working region determining means for generating working region data representing a working region as a specific region within the reference three-dimensional space, responsive to the working region position data for controlling at least the position of the working region within the reference three-dimensional space;

processing means for determining respective position correspondences between the constituent elements and a plurality of small regions of the reference three-dimensional space;

memory means for storing data expressing the position correspondences;

first interference judgement means for judging for each of the small regions, based on the working region data and the position correspondences, whether there is interference between the small region and the working region;

second interference judgement means for judging, for each of the small regions for which interference with respect to the working region is found by the first interference judgement means, whether there is interference between the working region and at least one of the constituent elements which corresponds to the each small region; and shape change means for operating on the three-dimensional shape data in accordance with the shaping operation, to change respective shapes of each of the constituent elements for which interference with respect to the working region is found by the second interference judgement means.

With such an apparatus, the first interference judgement means preferably judges interference between the working region and each small region by deciding whether there is interference between the working region and a circumscribed sphere which contains all of the constituent elements that correspond to the small region.

In addition, the apparatus preferably includes display means responsive to the three-dimensional shape data and the working region data for generating a display picture showing the object and the working region respectively within the reference three-dimensional space.

The apparatus moreover preferably includes function selection means, controllable for selecting one of a plurality of mathematical functions. In that case, the shaping operation is determined in accordance with a mathematical function selected by the function selection means.

Such a three-dimensional data shaping apparatus also can be configured to enable selective shaping of only a front surface or only a rear surface of a work object. The working region data include data defining a first normal vector which indicates a direction of orientation of a predetermined axis of the working region. Each of the constituent elements are of planar shape (in general, polygons) and the three-dimensional data include data defining, for each of the constituent elements, a second normal vector which is normal to the plane of that constituent element. In that case the apparatus further comprises:

scalar product calculation means for calculating the scalar product of the first normal vector and a second normal vector of a constituent element for which interference with respect to the working region has been found; and surface judgement means for judging, based on a calculation result obtained by the scalar product calculation means, whether the constituent element represents part of a front surface or a rear surface of the object.

The shape change means can thereby be controlled in accordance with decisions made by the surface judgement means, to execute shape changes only on respective ones of the constituent elements which:

(a) are judged to be part of a predetermined one of the front and rear surfaces, (b) which correspond to one of the small regions for which interference with respect to the working region has been found by the first judgement means, and (c) for which interference with respect to the working region has been found by the second judgement means.

In another aspect, such an apparatus can further comprise selection means controllable for selecting an arbitrary set of the small regions within the three-dimensional space, with the the first interference judgement means executing judgement of interference only between the working region and small regions within the selected set.

That can be achieved by assigning respective flags (i.e. flag bits) to each of the small regions, and by the selection means defining a cell region as a specific region (such as a sphere or a cube) within the three-dimensional space. The selection means sets to a predetermined state respective flags of each of the small regions which at least partially overlap with the cell region within the three-dimensional space, and the first judgement means is configured to execute the interference judgement with respect to the working region only for respective ones of the small regions for which a corresponding one of the flags is set to the predetermined state.

The invention further provides a three-dimensional data shaping apparatus for processing three-dimensional shape data which express respective shapes of a plurality of objects in relation to a reference three-dimensional space, the three-dimensional shape data representing at least a first object shape and a second object shape as a first set of constituent elements and a second set of constituent elements respectively, the apparatus comprising:

input means for generating position data, operable for controllably varying the position data and for selecting one of the first and second sets of constituent elements to be displaced within the three-dimensional space in accordance with changes in the position data;

processing means for determining position correspondences between respective elements of the first set of constituent elements and second set of constituent elements and a plurality of small regions of the reference three-dimensional space, and responsive to the position data for processing the three-dimensional shape data to effect the displacement of the selected one of the first and second sets of constituent elements;

memory means for storing data expressing the position correspondences;

first interference judgement means for judging, based on the position correspondences, whether there is mutual interference between any of the small regions having elements of the first set of constituent elements corresponding thereto and and any of the small regions having elements of the second set of constituent elements corresponding thereto; and second interference judgement means for judging, for each pair of the small regions for which mutual interference is found by the first interference judgement means, whether there is interference between any element of the first set of constituent elements which corresponds to a first small region of the pair and any element of the second set of constituent elements which corresponds to a second small region of the pair, and thereby judging whether there is interference between the first and second work objects.

With such an apparatus, a sufficiently high speed of data processing becomes possible for the user to displace one work object with respect to another work object (or objects) within the reference three-dimensional space, with the system executing real-time detection of occurrence of interference between the objects as a result of the displacement.

Thus, as can be understood from the various features summarized above, with a three-dimensional shaping apparatus according to the present invention, judgement of interference between respective elements of the shape represented by the three-dimensional shape data can be performed by operating on only those elements which lie within specific small regions of the three-dimensional space, i.e. specific small regions for which it has been determined (by the first interference judgement means) that there is interference with respect to the working region. Hence, the number of interference judgement operations is reduced, and so a considerable increase in processing speed can be achieved, by comparison with prior art types of three-dimensional data shaping apparatus in which it is necessary to perform interference judgement for all of the constituent elements of a work object. As a result, a sufficiently high speed of processing can be achieved that the user can confirm the effects of shaping operations by observing a real-time display picture.

Furthermore, since the working region can be displayed (as a pointing vector) on the screen of a display terminal together with the three-dimensional shape data, it is possible for the user to to specify shape changes which are made only within the working region. For example, a region of the displayed work object that is within the working region can be made to protrude outward or to be recessed, with respect to adjacent regions.

Moreover, since the input operations that are performed by the user are similar, irrespective of the type of shape change that is to be effected, i.e. there is a common input interface for all types of shaping operations, the apparatus is simple to operate.

In addition, since the apparatus can include means for distinguishing between a selected region (i.e. surface region) of the work object which is part of the front surface of the object and a selected region which is part of the rear surface of the work object, it is possible to make shape changes only on the front surface or only on the rear surface, as required by the user.

Furthermore, since the results of interference judgement performed by the second interference judgement means can be memorized as constituent element interference flags, the shaping operations to be performed by the user can be divided into a specifying mode in which the user specifies the working region, and a shaping mode in which the user executes shaping of only those constituent elements for which the corresponding constituent element interference flags have been set. Shaping can thereby be effected with a high degree of precision.

Also, by providing the small region selection means, it becomes possible to execute processing such as extracting a specific set of the small regions of the reference three-dimensional, and to display the contents of that set (i.e. a part of the work object) expanded in size, at the center of the display screen. Shaping operations can thereby be facilitated. Furthermore since the part of the small regions that is to be judged by the first interference judgement means can be selected using the small region selection means, the operating speed is increased, since it is not necessary to execute interference judgement for all of the small regions into which the reference three-dimensional space is divided.

Furthermore it becomes possible to divide the process of judging interference between two work objects which are expressed by respective sets of three-dimensional shape data into a stage of judgment of interference between small regions which have constituent elements of the two work objects respectively corresponding thereto, and a stage of judgement of interference between the only those constituent elements which corresponding to small regions for which interference has been found in the preceding stage. As a result, the overall number of processing operations can be minimized, and the required processing time can be greatly reduced, by comparison with the prior art.

BRIEF DESCRIPTION OF THE DRAWINGS

FIGS. 3A–3C show the respective configurations of a set of tables expressing position relationships, which are utilized in the first embodiment;

FIG. 5 is a flow diagram showing details of an initial step in the flow diagram of FIG. 41 for obtaining data values to be inserted into respective tables;

FIGS. 16A–16C show respective configurations of a set of tables expressing position relationships, used in the third embodiment;

FIGS. 20C–20C show the respective configurations of a set of tables expressing position relationships, which are utilized in the fourth embodiment;

FIGS. 25A1–25A3 and 25B1–25B3 show the respective configurations of a two sets of tables expressing position relationships, utilized in the fifth embodiment;

DESCRIPTION OF PREFERRED EMBODIMENTS

Figure 1:
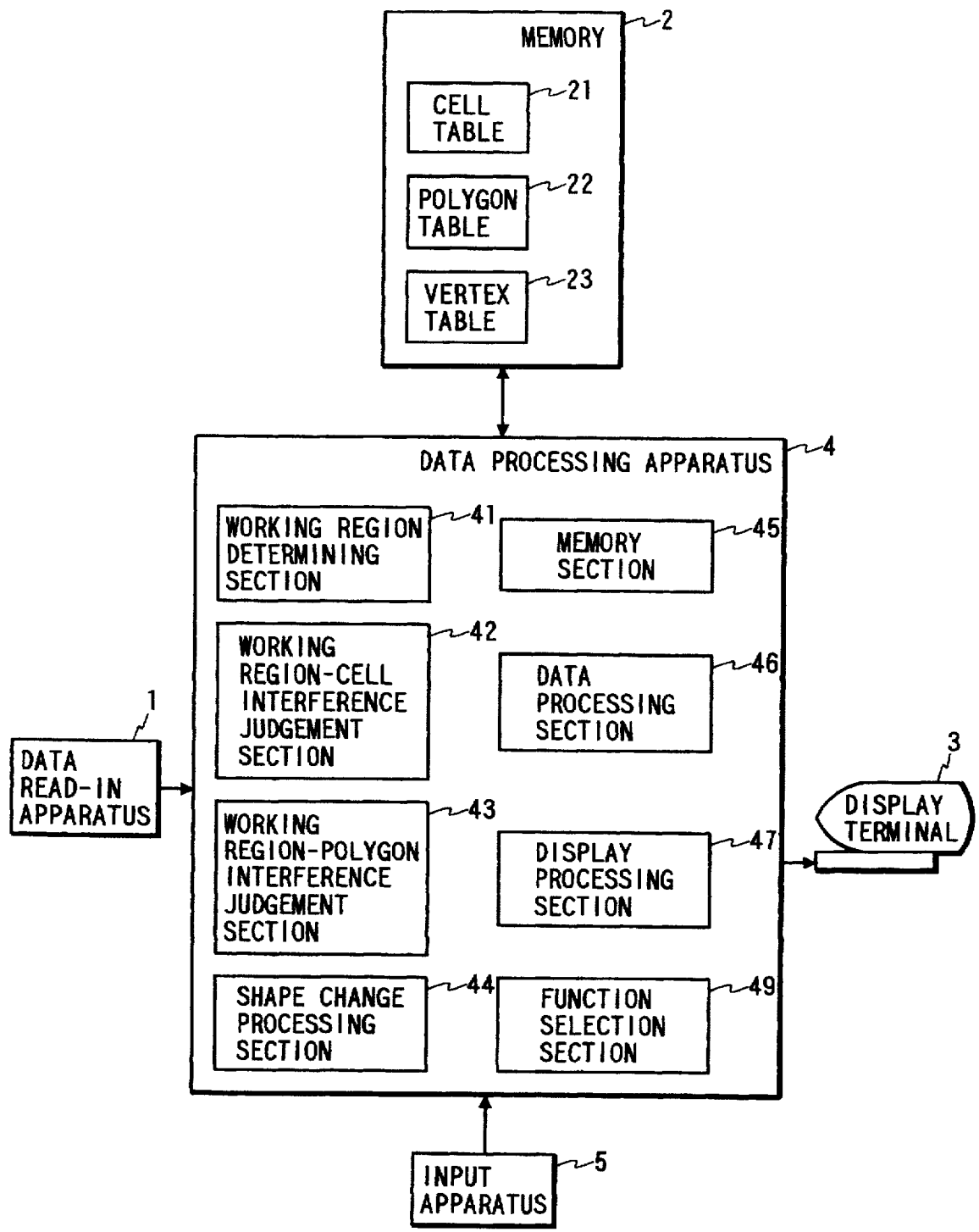
FIG. 1 is a general block diagram of a first embodiment of a three-dimensional data shaping apparatus according to the present invention.

A first embodiment of a three-dimensional data shaping apparatus according to the present invention will be described, referring first to the basic system block diagram of FIG. 1. In FIG. 1, a data read-in apparatus 1 supplies three-dimensional shape data representing the shape of a work object. The data read-in apparatus 1 can for example consist of an optical scanning apparatus, using laser beam scanning of the work object in conjunction with an opto-electric sensor, to generate the three-dimensional shape data. A memory 2 serves to store the three-dimensional shape data, and includes three regions utilized as tables, as described hereinafter. A display terminal 3 generates a three-dimensional picture, based on the three-dimensional shape data. An input apparatus 5 is used by a user to input various data and commands, including position data. The term "position data" is used here in referring to data for determining the position, within a reference three-dimensional space, of a working region (described hereinafter). The input apparatus 5 can also be used to input commands for specifying a shaping operation to be executed on a selected region of the work object as represented by the three-dimensional shape data. The input apparatus 5 can typically consist of a pointing device such as a mouse, or a combination of such a pointing device and a keyboard. A data processing apparatus 4 is coupled to receive input data from the data read-in apparatus 1, input data and commands from the data processing apparatus 4, to transfer/receive data to/from the memory 2, and to supply display data to the display terminal 3. The data processing apparatus 4 executes various data processing operations, including shaping processing of the three-dimensional shape data.

Figure 2:
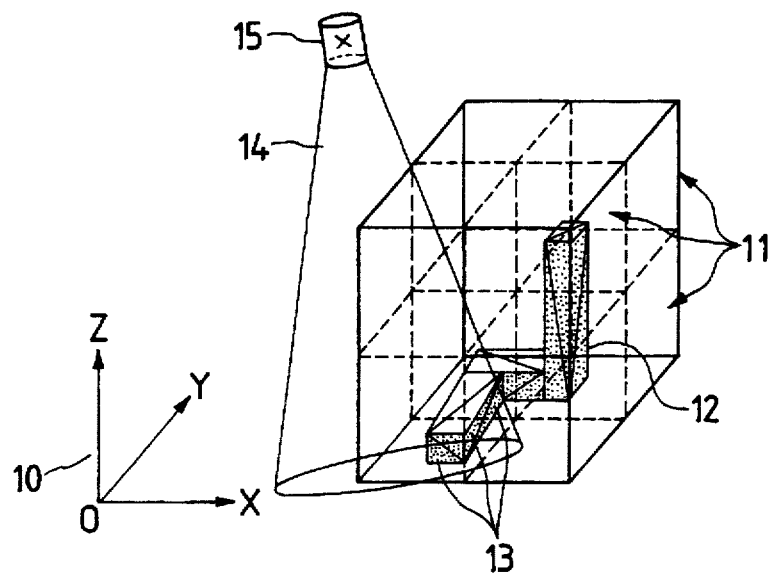
FIG. 2 is a diagram to illustrate relationships between a working region, displayed as a pointing cursor, and the contents of three-dimensional shape data, for the first embodiment.

FIG. 2 shows an example of the contents of the three-dimensional data which are operated on by the apparatus of FIG. 1, with respect to a reference three-dimensional space, and also illustrates how the data will appear in a display picture generated by such a three-dimensional data shaping apparatus. The work object (expressed by the three-dimensional shape data) is represented as being within the reference three-dimensional space, which is divided beforehand into a plurality of small fixed-size regions. Such regions will be referred to herein as cells. The cells are preferably of rectangular shape, having respective sides aligned with the X, Y and Z axes of a reference coordinate system 10, and will be assumed to be cubes, as for the cells 11 shown in FIG. 2. In the example of FIG. 2, the entire three-dimensional space is in the shape of a cube and is divided into 8 cells by sectioning into halves through planes which are respectively parallel to the X, Y and Z axes, as shown.

The work object 12 is displayed within the three-dimensional space as shown. The three-dimensional shape data represents the surface shape of the work object 12 as a plurality of polygons, of various sizes and shapes. In the following description of embodiments, it will be assumed that the polygons are triangles, such as the triangles 13 which represent the work object 12 in FIG. 2. However the invention is not limited to the use of such polygons. Each polygon has a unique correspondence with one of the cells 11. In the following description, it will be assumed that this unique correspondence is established as follows: if the centroid of a polygon lies within a cell, then the polygon corresponds uniquely to that cell. However the invention is not limited to such a method of establishing the unique correspondence. In the following description, the statement that a polygon corresponds to a cell signifies that the above-described unique correspondence exists between the polygon and the cell.

The memory 2 has stored therein three tables, as indicated in FIG. 1, i.e. a cell table 21, a polygon table 22 and a vertex table 23, whose respective contents are as shown in FIG. 3. The cell table 21 stores data items relating to the cells and has a set of entries which respectively correspond to the cells (i.e. a total of 8 entries, for the example of FIG. 2), these entries being numbered from 1 to 8 respectively, with each cell being assigned a corresponding number which is indicated in a C.no field of the corresponding entry in the cell table 21. The polygon table 22 stores data relating to the polygons, with each polygon being assigned a corresponding number, which is indicated in a P.no field of a corresponding entry in the polygon table 22. The vertex table 23 stores data relating to the vertexes of the polygons, with each vertex being assigned a corresponding number, which is indicated in the V.no field of the corresponding entry in the vertex table 23. The three vertexes of each (triangular) polygon will be respectively designated as the 1st, 2nd and 3 d vertexes of the polygon, in an arbitrary sequence. The position and size of each polygon within the three-dimensional space is determined by the respective positions of these vertexes, in conjunction with a normal vector. As used herein, the term "normal vector" signifies a vector which is normal to the plane of the polygon and which, considering the polygon as a part of the surface of the work object (as represented by the three-dimensional shape data), extends outward from the work object surface.

The respective fields of the cell table 21, for each cell, are as follows:

C.no : cell number.

C.num: total number of polygons which correspond to the cell.

C.flag: decision flag, indicating whether or not interference with respect to the working region (described hereinafter) has been detected for the cell.

C.adr: the number of the leading entry of the section of the polygon table in which are listed the polygons which correspond to that cell.

C.x: x-coordinate of the circumscribed sphere which contains all of the polygons that correspond to the cell.

C.y: y-coordinate of the circumscribed sphere which contains all of the polygons that correspond to the cell.

C.z: z-coordinate of the circumscribed sphere which contains all of the polygons that correspond to the cell.

C.r: radius of the circumscribed sphere which contains all of the polygons that correspond to the cell.

The respective fields of the polygon table 22, for each polygon, are as follows:

P.no: the polygon number

P.v1: vertex number (i.e. V.no value) of the 1st vertex of the polygon

P.v2: vertex number of the 2nd vertex of the polygon

P.v3: vertex number of the 3 d vertex of the polygon

P.tx: x-component of the normal vector of the polygon

P.ty: y-component of the normal vector of the polygon

P.tz: z-component of the normal vector of the polygon

The respective fields of the vertex table 23, for each polygon, are as follows:

V.no: vertex number

V.x: x-coordinate of the vertex

V.y: y-coordinate of the vertex

V.z: z-coordinate of the vertex

V.flag: flag which is set to the ON if it is judged that the vertex lies within the working region, and otherwise is in the OFF state.

Although the invention will be described for the case in which each polygon is a triangle, it would be possible to utilize a polygon consisting of a greater number of vertexes, by suitably expanding the vertex table 23, i.e. expanding the region of the memory 2 in which is stored the vertex table 23.

The data processing apparatus 4 includes a working region determining section 41 which generates working region data, i.e. data which define a working region, as a specific region in the reference three-dimensional space. Shaping of a specific part of the work object, located within the working region, is performed. The working region determining section 41 determines the shape and position of the working region within the three-dimensional space, with at least the position being variable by the user in accordance with working region position data which are supplied to the working region determining section 41 by the user through the input apparatus 5. The data processing apparatus 4 also includes a working region—cell interference judgement section 42, a working region—polygon interference judgement section 43, a shape change processing section 44, a memory section 45, a data processing section 46, a display processing section 47, and a function selection section 49. The memory section 45 stores the data which express the working region, produced by the data processing section 46. The working region—cell interference judgement section 42 judges the state of interference between the working region and the cells. The working region—polygon interference judgement section 43 judges the state of interference between the working region and the polygons which represent the shape of the work object. The shape change processing section 44 performs shaping of a specific region of the work object, which lies within the working region, by shifting respective positions of vertexes of that specific region, as specified by the user through information supplied via the input apparatus 5. The function selection section 49 can be designated by the user to select a mathematical function, for executing shaping of the selected region of the work object in accordance with that function. The display processing section 47 generates display data for the display terminal 3, based on the working region data and on the contents of the tables 21,22, 23, whereby the display terminal 3 generates a display picture showing the working region in the form of a pointing cursor (described hereinafter) and showing the work object as represented by the polygons, respectively located with respect to the reference three-dimensional space. The data processing section 46 performs various types of data processing and calculations which are required in the overall operation of the three-dimensional data shaping apparatus.

Instead of judging interference between the working region and all of the polygons which represent the surface of the work object, the working region—polygon interference judgement section 43 judges only interference between the working region and specific polygons, i.e. those polygons which correspond to cells for which interference (with respect to the working region) has been detected by the working region—cell interference judgement section 42. The shape change processing section 44 performs shaping by altering the positions of vertexes of only those polygons for which interference (with respect to the working region) has been detected by the working region—polygon interference judgement section 43.

Figure 4:
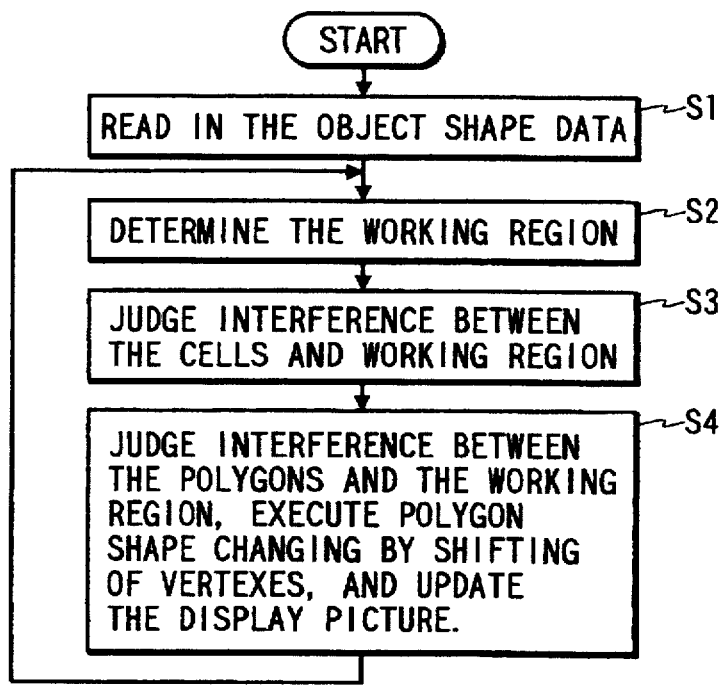
FIG. 4 is a flow diagram showing the basic operating sequence of the first embodiment.

The operation of this embodiment will be described referring first to the flow diagrams of FIGS. 4, 5, 8 and 9. Referring first to FIG. 4, the overall processing flow basically consists of four steps, designated as S1 to S4. In step S1, the three-dimensional shape data representing the surface shape of the work object are read in from the data read-in apparatus 1. Based on these data, various items which have been described above are obtained and entered into the respective fields of the cell table 21, polygon table 22 and vertex table 23 of the memory 2. More specifically, the processing operations which are executed in step S1 are illustrated in the flow diagram of FIG. 5.

Firstly, in step $S1_1$ each C.flag field in the cell table 21 is initialized to the OFF state. The vertex coordinates and the components of the normal vector for a polygon are derived, from the three-dimensional shape data read in from the data read-in apparatus 1, and the coordinates of the centroid of that polygon are calculated (step $S1_2$). Based on the centroid position thereby obtained, the entry address (C.no), in the cell table 21, of the cell corresponding to that polygon is obtained (step $S1_3$). The C.num field of that corresponding cell, in the cell table 21, is then incremented by one (step $S1_4$). Operation then returns to step $S1_2$, and the above process is repeated for all of the polygons of the three-dimensional shape data. It can be understood that upon completion of that processing for all of the polygons of the three-dimensional shape data, each C.num field will contain a value expressing the total number of polygons which correspond to that cell. For example in FIG. 3, the cell for which C.no is 1 has a total of (K−1) corresponding polygons, while the cell for which C.no is 2 has (L−K) corresponding polygons.

Operation then proceeds to a step $S1_6$, in which the respective C.adr values for the cells are derived, based on the C.num values that have been established for the cells, and are written into the cell table 21. For example, the C.num value for the cell with C.no equal to 1 is (K−1), so that the leading one of the set of entry addresses (P.no), in the polygon table 22, for the cell having the C.no address 2 must be K. Thus, C.adr is set as K, in the cell table 21, for that cell.

A loop of steps $S1_7$ to $S1_{10}$ is then successively executed, for each of the polygons. The purpose of that loop is to establish, for each polygon, the appropriate entry in the polygon table 22, i.e. the appropriate P.no value, and to then write the respective vertex numbers of the vertexes of that polygon, and the components of the normal vector of that polygon, into the polygon table 22. The first two steps, $S1_7$ and $S1_8$ are respectively identical to the preceding steps $S1_2$ and $S1_3$, and serve to find the entry position (C.no) of that polygon in the cell table 21. The next step, $S1_9$, uses that C.no to to establish the appropriate entry position (P.no) of the polygon in the polygon table 22. The aforementioned vertex numbers and normal vector components of the polygon are then written into the respective fields of that entry in the polygon table 22, in step $S1_{10}$. The P.no entries are respectively assigned to the polygons as follows, considering for example the set of polygons which correspond to the cell having C.no equal to 2. During successive executions of the loop of steps $S1_7$ to $S1_{10}$, the first of these polygons which is encountered is assigned the P.no value K, since that has already been established as the leading P.no value, i.e. the leading entry address within the polygon table 22, for that set of polygons. The next polygon to be encountered which corresponds to the cell with C.no equal to 2 is assigned the P.no value (K+1), and so on in succession.

When that has been completed for all of the polygons of the three-dimensional shape data, a step $S1_{12}$ is executed, in which respective sets of coordinates for each of the vertexes of each polygon are written into V.x, V.y, V.z fields of the vertex table 23, at the corresponding entry address (V.no). In addition, the flag V.flag is reset to zero, for each of the entries in the vertex table 23.

Finally in step $S1_{13}$, for each of the cells, the values which define the circumscribed sphere of the set of polygons corresponding to that cell, are written into respective fields of the corresponding entry address (C.no) in the cell table 21.

The following procedure is executed, for each of the cells, to calculate the value of radius C.r and the coordinates C.x, C.y and C.z of the circumscribed sphere of the polygons corresponding to that cell. Firstly, the coordinates of each of the vertexes of the respective polygons corresponding to that cell are examined, to find the maximum value of x-coordinate. That value will be designated as C.MaxX. The smallest value of x-coordinate is similarly found, and will be designated as C.MinX. The x-coordinate C.x of the center of the required circumscribed sphere is thereby obtained as a value which is midway between C.MaxX and C.MinX. The respective values of C.MaxY and C.MinY, C.MaxZ and C.MinZ, are similarly obtained, to thereby obtain the values of C.y and C.z. The values of the coordinates C.x, C.y and C.z are then written into the respective fields of the entry for that cell in the cell table 21.

A value C.Max is then obtained as follows:

$$C.Max = \max(C.MaxX - C.MinX, C.MaxY - C.MinY, C.MaxZ - C.MinZ) \quad (1)$$

The radius C.r of the circumscribed sphere of that cell is then obtained as follows:

$$C.r = \sqrt{(3 * C.Max^2/4)} \quad (2)$$

As stated above, the contents of the cell table 21, polygon table 22 and vertex table 23 are stored in the memory 2. These contents are utilized in processing which is executed by the display processing section 47, to generate a three-dimensional picture on the display terminal 3, showing an image of the work object.

Figure 6:
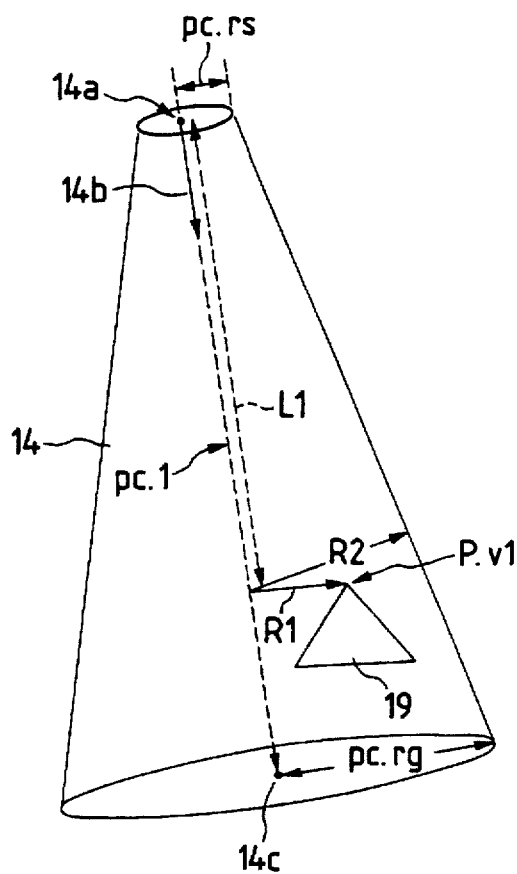
FIG. 6 is a diagram illustrating how the configuration of a working region is specified, in the first embodiment.

Step S2 of FIG. 4 is then executed, to determine the working region. The aforementioned position data are supplied by the user via the input apparatus 5, for specifying at least the position of the working region. Using the position data, the working region determining section 41 of the data processing apparatus 4 derives data which determined the working region (i.e. the size, shape and position of the working region within the three-dimensional space), which are used by the display processing section 47 to generate a corresponding image of the working region on the display terminal 3. That image, which can be freely moved by the user within the reference three-dimensional space by varying the position data, will be referred to as the pointing cursor. The working region can be of any arbitrary shape, however it will be assumed in the following that the working region has an axially symmetrical shape, which can be selectively varied by the user between a cone, truncated cone, or cylinder, for example. The configuration of the working region, and hence of the pointing cursor, is illustrated in FIG. 6. A point 14a, which will be referred to as the starting point of the working region defines the center of one circular end of the working region, which will be referred to as the starting circle, having a radius which will be designated as the starting radius pc.rs. A point 14c defines the center of the opposite end of the pointing cursor, which is also circular and will be referred to as the terminating circle, having a radius designated as the terminating radius pc.rg. A central axis, of length designated as pc.l, extends between the central points 14a, 14c of the starting and terminating circles. In this example the pointing cursor (and hence the working region) has the shape of a truncated cone with length pc.l.

The starting point 14a of the pointing cursor has the position coordinates pc.x, pc.y and pc.z, which will be referred to as the pointing cursor position coordinates. The direction of the pointing cursor is defined by a vector 14b which extends axially from the starting point 14c of the pointing cursor, normal to a plane containing the starting circle, and defined by vector components pc.tx, pc.ty and pc.tz. This vector 14b will be referred to as the normal vector of the working region.

The above values defining the pointing cursor 14 are stored in the memory section 45 of the data processing apparatus 4.

To assist the user in recognizing the starting point of the pointing cursor 14 in the display picture, an indicator mark 15 can be generated in the display picture of the display terminal 3, adjacent to the pointing cursor starting point, as illustrated in FIG. 2.

Each time the user designates a change in the position of the working region (by inputting a change in the position data), the working region determining section 41 receives the new data which have been supplied from the input apparatus 5 and which represent the degree of change in the pointing cursor, and calculates respective corresponding changes in the various values which define the pointing cursor as described hereinabove. The corresponding stored values in the memory section 45 are then accordingly updated, and the updated values supplied to the display processing section 47 so that a change in position of the displayed pointing cursor occurs. For example if an operation for moving the working region by an amount Delta.X in the x-coordinate direction is to be executed, then the value Delta.X is inputted through the input apparatus 5, and the working region determining section 41 updates the value of pc.x to pc.x+Delta.X.

Figure 7A:
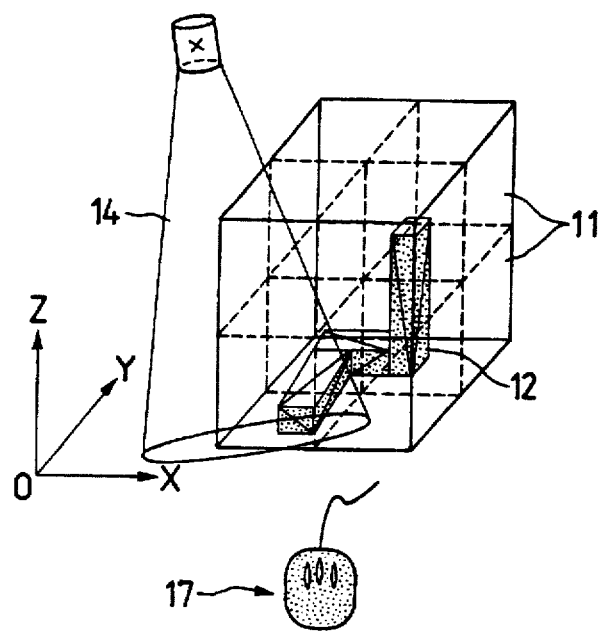
FIGS. 7A–7C show examples of utilizing pointing devices for inputting position data for determining the working region position within a reference three-dimensional space.
Figure 7B:
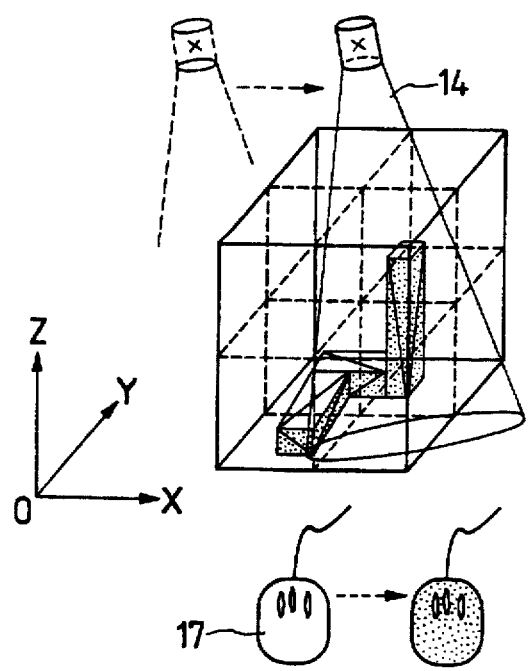
Figure 7C:
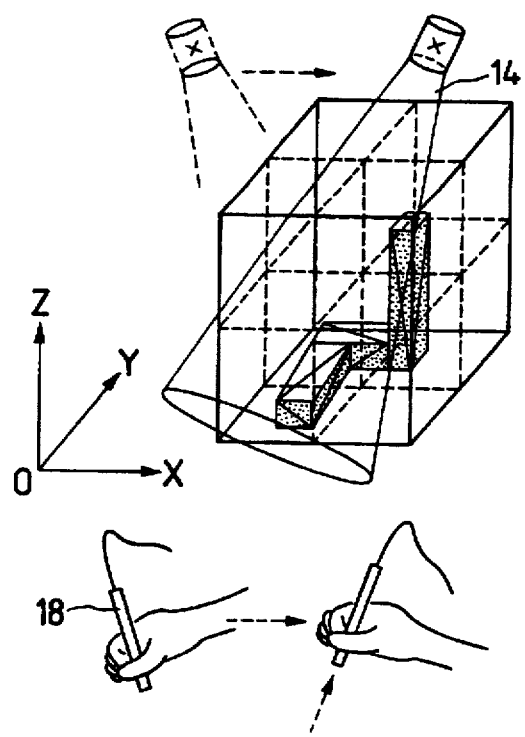

As illustrated in diagram (A) of FIG. 7, the input apparatus 5 can include a mouse 17. The upper part of that diagram shows the pointing cursor, the cells, and the work object as represented by the three-dimensional shape data, as these will appear in the display picture. If the user moves the mouse 17 to the right by a certain amount, then a corresponding amount of change in the value of x-coordinate of the pointing cursor position will be specified, as a change in the position data. As a result, as shown in diagram (B) of FIG. 7, there will be a corresponding change in position of the pointing cursor in the x-direction. Thus the user can use the mouse 17 to directly move the working region, in relation to the work object, while observing the results of such actions on the display picture.

Alternatively, the input apparatus 5 can include a three-dimensional pointing device which is equipped with sensors (such as magnetic sensors) for detecting changes in inclination of the pointing device, and producing corresponding changes in the position data. In that case the user can directly execute changes in the x, y, and z-coordinate values of the position data position, i.e. can freely move the working region in the three-dimensional space, by simple hand movements. Use of such a three-dimensional pointing device 18 is illustrated in diagram (C) of FIG. 7.

The invention is however not limited to the above types of input device.

Figure 8:
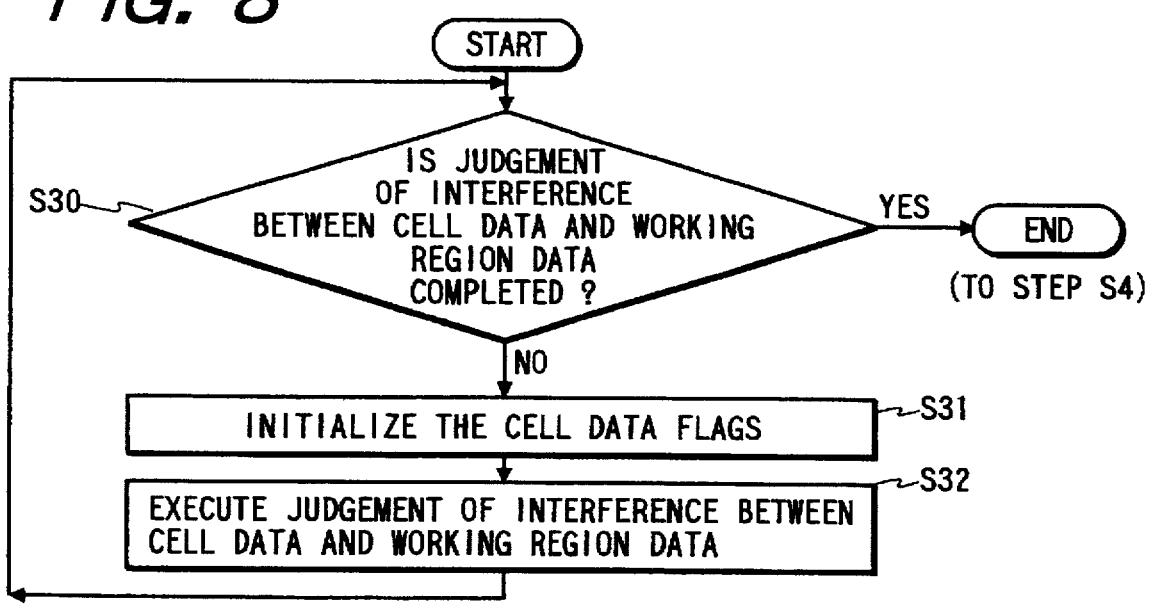
FIG. 8 is a flow diagram showing a procedure which is executed for judging interference between cells and the working region, with the first embodiment.

Referring again to FIG. 4, step S3 is executed as follows. In this step, the working region—cell interference judgement section 42 judges interference between each of the cells and the working region, based on the three-dimensional position data which have been supplied from the input apparatus 5, and the C.flag of each cell for which interference has been found is set to the ON state. A flow diagram of the operations performed in step S6 is shown in FIG. 8.

In the first step S30, a decision is made as to whether judgement of interference with respect to the working region has been completed for all of the cells. If such judgement has not yet been completed, operation proceeds to S31, in which the C.flag fields of the respective cells, in the cell table 21, are set to the OFF state. The operations S32, in which judgement of interference with respect to the working region is performed, for each of the cells. For each cell for which interference with the working region is found, the corresponding C.flag field in the cell table 21 is set to the ON state. As a result of the operations performed in FIG. 8, position correspondence relationships are established between the working region, (represented by the position data) and each of the cells, with these relationships being stored in the tables.

The conditions for judgement of interference between the working region and a cell are as follows. Firstly, the derivation of two necessary values L and R will be described. Referring again to FIG. 6, considering the center of the circumscribed sphere of the polygons corresponding to the cell in question, the length of a line which extends between the center of the circumscribed sphere (having coordinates C.x, C.y and C.z) and the central axis of the pointing cursor, in a direction at right angles to that central axis, will be designated as R. The distance from the point of intersection of that line to the starting point 14a of the pointing cursor will be designated as L. The values of L and R are obtained as follows:

$$L = pc.tx * (C.x - pc.x) + pc.ty * (C.y - pc.y) + pc.tz * (C.z - pc.z) \quad (3)$$

$$R = \sqrt{((L * pc.tx - (C.x - pc.x))^2 +} \quad (4)$$

$$(L * pc.ty - (C.y - pc.y))^2 + (L * pc.tz - (C.z - pc.z))^2)$$

Based on the values thus obtained for L and R, it is judged that there is interference between a cell and the working region if the following relationship is satisfied:

$$R \leq pc.rs + (pc.rg - pc.rs) * L/pc.l + C.r \quad (5)$$

After completion of judging interference with respect to the working region for all of the cells, operation then proceeds to S4 of FIG. 4. In step S4 the following operation is performed, for each of the cells for which interference with respect to the working region has been found in step S3. For each of the polygons corresponding to the cell, judgement is performed of interference with respect to the working region, in step S4. For each polygon for which interference with respect to the working region is found, displacement of the vertexes of the polygon is performed, if necessary, in accordance with a change in shape of the work object that has been previously designated by the user. Data relating to the polygons, in the polygon table 22, and to the vertexes, in the vertex table 23, are then accordingly updated. Corresponding changes are thereby made in the display data generated by the display processing section 47, so that the work object is now displayed by the display terminal 3 with the specified change in shape having been executed for the region of the work object which lies within the working region.

Figure 9:
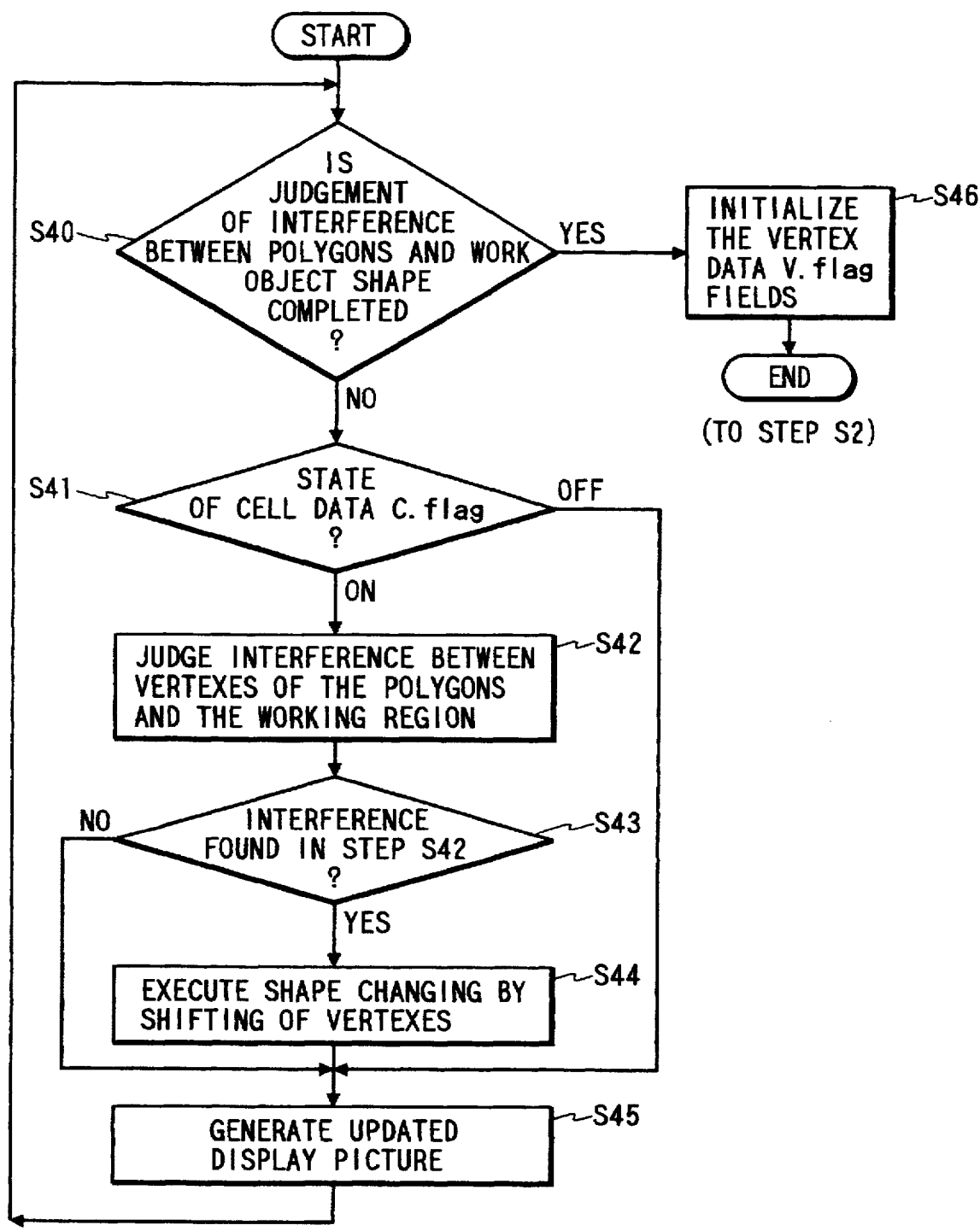
FIG. 9 is a flow diagram showing a procedure which is executed for judging interference between polygons and the working region, with the first embodiment.

Details of the processing executed in step S4 will be described referring to the flow diagram of FIG. 9. The loop of steps S40 to S45 in FIG. 9 is executed successively for each of the polygons of the three-dimensional shape data. These steps are as follows:

Step S40: A decision is made as to whether interference judgement with respect to the working region has been completed for all of the polygons. It that has been completed, operation then proceeds to step S46.

Step S46: All of the V.flag fields of the vertex table 23 are initialized to the OFF state.

If it is found in step S40 that interference judgement has not yet been completed for all polygons, operation then proceeds to step S41, to begin processing for the next polygon.

Step S41: A decision is made as to whether the C.flag field of the cell to which that polygon corresponds is set to the ON state. If the flag is OFF, the operation then proceeds to step S45, and otherwise the operation proceeds to step S42. That is to say, if it has been found in the aforementioned step S3 that there is a possibility of interference between that polygon and the working region, then step S42 is executed.

Step S42: A decision is made as to whether there is interference between any of the vertexes of that polygon and the working region.

This judgement is executed as follows. If the V.flag field (in the vertex table 23) for the first vertex P.v1 of the polygon is OFF, then the following processing is executed. The processing will be described referring to FIG. 6, in which it is assumed that there is interference between a polygon 19 and the working region. Firstly, the V.flag field for that vertex P.v1 is set to ON. Next, the length R1 is obtained for a line which extends between that vertex P.v1 and the central axis of the working region, at right angles to that central axis. In addition, the distance L1 between the point of intersection of that line with the central axis and the starting point 14a of the working region is obtained. The length R2 is then obtained, as the length of a line which extends from that point of intersection to the periphery of the working region.

The values of L1 and R2 are calculated as follows, with the x, y and z-coordinate values of the vertex that is being processed being designated as V.x, V.y and V.z respectively:

$$L1 = pc.tx * (V.x - pc.x) + pc.ty * (V.y - pc.y) + pc.tz * (V.z - pc.z) \quad (6)$$

$$R1 = \sqrt{((L1 * pc.tx - (V.x - pc.x))^2 +} \quad (7)$$

$$(L1 * pc.ty - (V.y - pc.y))^2 + (L1 * pc.tz - (V.z - pc.z))^2)$$

$$R2 = pc.rs + (pc.rg - pc.rs) * L1/pc.l \quad (8)$$

If R1, R2 and L1 simultaneously satisfy both of the following relationships (9) and (10), then it this indicates that there is interference between that vertex and the working region.

$$0 \leq L1 \leq pc.l \quad (9)$$

$$R1 \geq R2 \quad (10)$$

Interference judgement processing is similarly executed for each of the remaining vertexes P.v2 and P.v3 of the polygon.

Step S43: A decision is made as to whether at least one of the vertexes of the polygon satisfies both of the conditions (9) and (10) above. If that is true, then this is taken as indicating that there is interference between that polygon and the working region, and processing proceeds to step S44. Otherwise, then processing proceeds to S45.

Step S44: The shape change processing section 44 performs updating processing to change the coordinate values of each vertex for which interference with respect to the working region has been found in step S42, with resultant updated values being written into the vertex table 23 for each of these vertexes. The amount and direction of change of vertex position is determined by the aforementioned shape change of the work object region (lying within the working region) that has been specified by the user. The changes may for example be determined in accordance with a mathematical function which the user has specified to be selected by the function selection section 49. In addition, the data processing section 46 recalculates the values of center coordinates and radius of the circumscribed sphere for the cell to which the polygon corresponds, with resultant updated values then being written into the corresponding fields of the cell table 21.

The calculation of updated values for the x, y and z coordinates V.x, V.y and V.z of a vertex can for example be performed as follows. The processing utilizes a real numeric function k(L1, R1, R2), having as factors the values L1, R1 and R2 which were obtained in step S42:

$$V.x = V_x + k(L1, R1, R2)*pc.tx \quad (11)$$

$$V.y = V_y + k(L1, R1, R2)*pc.ty \quad (12)$$

$$V.z = V_z + k(L1, R1, R2)*pc.tz \quad (13)$$

As a result of processing executed in accordance with the above equations (11) to (13), the vertex is moved, in relation to the starting point of the working region, by an amount which is determined in accordance with the function k(L1, R1, R2).

Recalculation of the radius of the circumscribed sphere is performed as follows. Firstly, using the following equation (14), the distance Rv between the new position of the vertex and the center of the circumscribed sphere is calculated:

$$Rv = \sqrt{((C.x - V.x)^2 + (C.y - V.y)^2 + (C.z - V.z)^2)} \quad (14)$$

Next, using the following relationship (15), a comparison is made between the radius of the circumscribed sphere and Rv. If the relationship (15) is satisfied, then the radius of the circumscribed sphere is updated to become Rv. Otherwise, the radius is left unchanged.

$$Rv > C.r \quad (15)$$

Step S45: The updated data obtained in step S4 are written into respective fields of the tables in the memory 2. Based on the updated contents of the tables, the display processing section 47 provides display data to the display terminal 3 for generating an updated display picture. Operation then returns to step S40.

Step S46: If it is found in step S40 that interference judgement with respect to the working region has been completed for all of the polygons, operation then proceeds to step S46, in which the flag V.flag is set to OFF, for all of the entries in the vertex table 23.

Figure 10A:
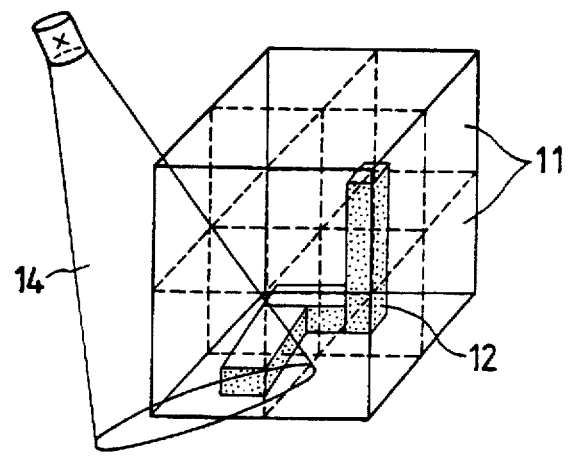
FIGS. 10A–10C show diagrams for illustrating each of the interference judgement stages executed by the first embodiment.
Figure 10B:
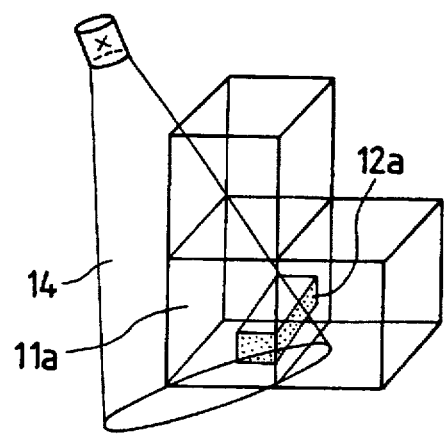
Figure 10C:
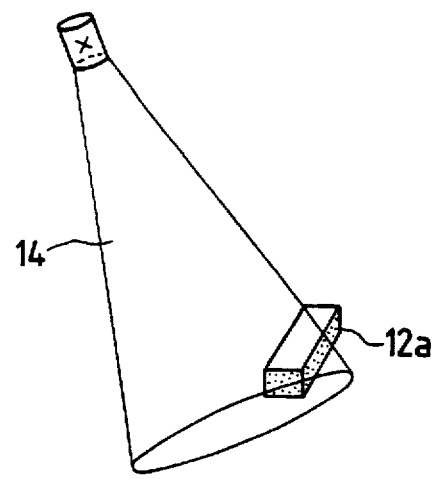
Figure 11A:
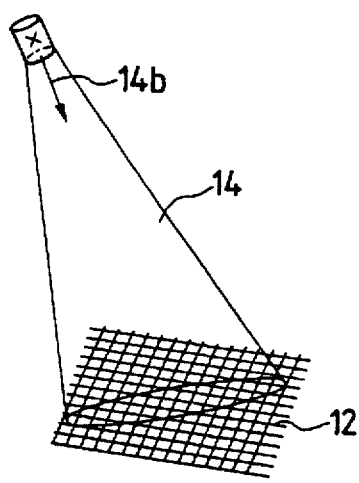
FIGS. 11A–11F show examples of shaping operations which can be executed by the first embodiment.
Figure 11B:
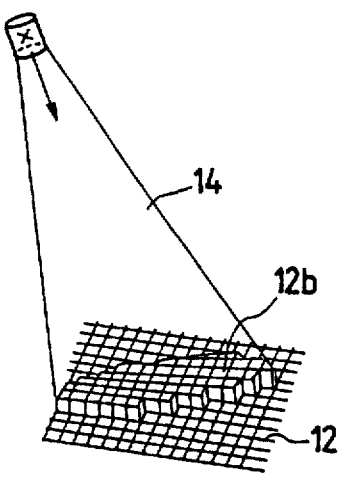
Figure 11C:
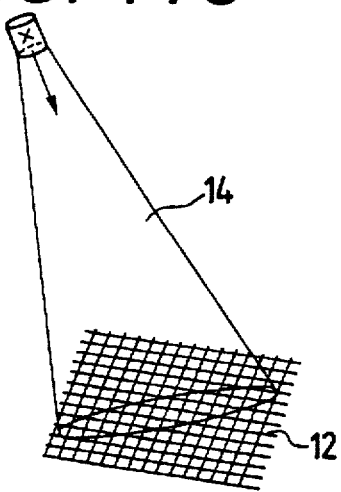
Figure 11D:
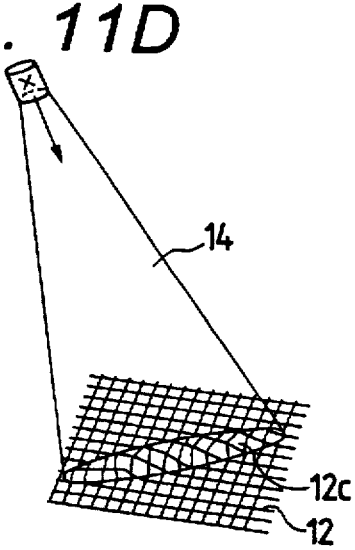
Figure 11E:
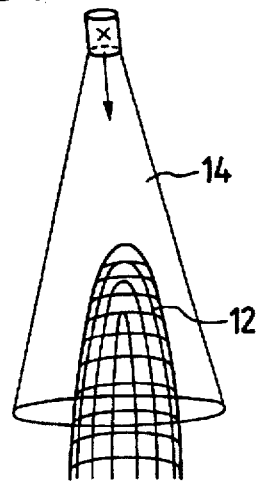
Figure 11F:
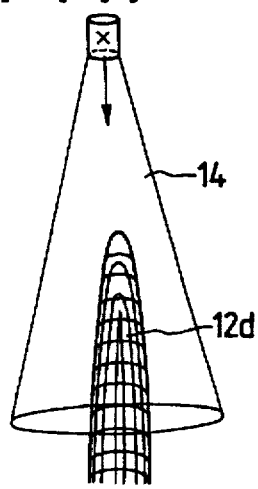

The advantages provided by the above embodiment are illustrated in FIG. 10, which shows how interference judgement is performed in two separate stages. It is assumed that initially, a work object 12 is represented by the three-dimensional shape data within a three-dimensional space that is divided into a set of cells 11, with the pointing cursor 14 having been positioned such that a part of the work object 13 lies within the working region. The total number of cells will in general be very much smaller than the total number of polygons which represent the work object in the three-dimensional shape data.

The interference judgement processing is executed in the following two successive stages:

First stage: The system judges interference between the working region (represented by the pointing cursor 14) and the cells 11. As a result, a specific set of cells is selected, as illustrated in diagram (B) of FIG. 10, i.e. only those cells are selected which at least partially overlap the working region within the three-dimensional space, and which have one or more polygons of the work object corresponding thereto, with the circumscribed sphere of these polygons satisfying the condition described hereinabove. In this example, only one cell (11a) satisfies these criteria.

Second stage: The system judges interference between the working region and only the polygons of that part (12a) of the work object 12 which corresponds to a cell (or cells) for which interference with respect to the working region has been detected in the first judgement stage.

It can thus be understood that in general, in the second judgement stage, it will only be necessary to operate on a small part of the total number of polygons which constitute the represented work object 12. And since as described above the total number of cells 11 will be much smaller than that total number of polygons, the amount of processing in the first judgement stage will also be small. Thus, the overall amount of processing required to execute interference judgement can be substantially reduced, by comparison with a prior art type of apparatus with which it is necessary to perform interference judgement for all of the polygons that represent the work object. Hence a significant increase in processing speed can be achieved, with a corresponding increase in speed of response to input operations that are performed by the user through the input apparatus 5. The user can thus immediately confirm the effect of such input operations, since the display picture generated by the display terminal 3 will provide real-time response to such operations.

It should be noted that the real numeric function k(L1, R1, R2), used in equations 11, 12 and 13 for updating the coordinates of the vertexes in step 44, can be freely selected in accordance with the type of shaping operation that is required. As a result, various types of shaping operation can be performed without changing the basic algorithm described above. Such function selection is be performed by the user by inputting (through the input apparatus 5) commands to the function selection section 49, for designating a required function.

Examples of relationships between shape changes and selected functions are shown in FIG. 11. First, it is assumed that the real numeric function k(L1, R1, R2)is a constant, i.e.:

$$k(L1, R1, R2) = \text{constant} \quad (16)$$

If such a function is selected, then the effect of the shaping operation on the region of the work object which lies within the working region is to uniformly raise or to uniformly lower that part of the work object In FIG. 11, diagram (A) shows an example of the work object prior to executing such a shaping operation, and diagram (B) shows the result of uniformly raising the part 12b of the work object which lies within the working region.

If the function k(L1, R1, R2) is of the form given by the following equation 17, then the effect of the shaping operation is to form a depressed region or a protruding region of the object surface, with that region having gradually curved contours.

$$k(L1, R1, R2) = c*(1 - 1/(1\exp(2*l*R1/R2+1))) \quad (17)$$

In the above, c and l are arbitrary constants.

In FIG. 11, diagram (C) shows an example of the surface of work object 12 prior to executing such a shaping operation, and diagram (D) shows the result of operating on the object to form a raised region 12d having gradually curved contours.

If the number of factors of the real numeric function k(L1, R1 R2) is increased, i.e. the function becomes k(L1, R1, R2, pc, l), then it becomes possible to produce a sharply curved protruding region or a sharply curved recessed region of the work object. An example of this is illustrated in diagrams (E) and (F) of FIG. 11, for the case of the function being of the form given by the following equation (18), in which pc and l are arbitrary constants.

$$k(L1, R1, R2) = c*(1-1/(1-\exp(2*l*L1/pc.l+1))) \quad (18)$$

It can thus be understood that by expanding the number of factors of the real numeric function, various types of shaping operation can be executed while using the same operating interface.

In the above description of the first embodiment, only the inputting of position data by the user, through the input apparatus 5, for determining the position of the working region has been described. However it is equally possible to configure the apparatus such that the user can also input data for specifying the size and shape of the working region, i.e. for determining the parameters pc.rs, pc.l and pc.rg, which are shown in FIG. 6.

A second embodiment of a three-dimensional data shaping apparatus according to the present invention will be described, whereby it is possible to selectively shape only a region of the front surface of the work object, or to shape only a region of the rear surface, i.e. to perform shaping of the front and rear surfaces mutually separately. As used in the following description and in the appended claims, the term "front surface" of the work object signifies that part of the surface of the work object (as represented by the three-dimensional shape data) which is the front surface as viewed along the direction of the normal vector of the pointing cursor, and the term "rear surface" refers to the remaining part of the work object surface.

Figure 12:
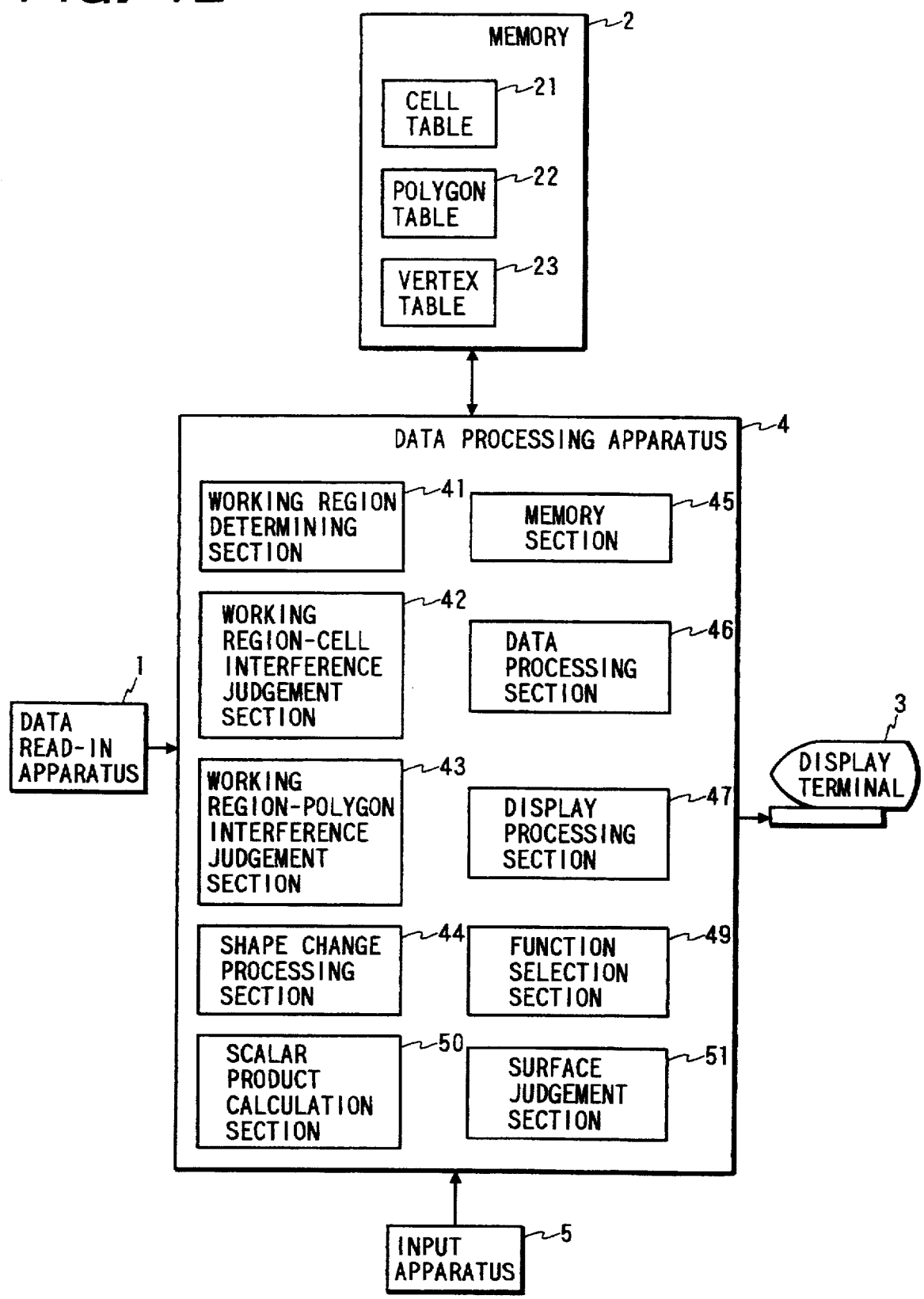
FIG. 12 is a general block diagram of a second embodiment of a three-dimensional data shaping apparatus according to the present invention.

The basic configuration of this embodiment is shown in the general block diagram of FIG. 12. The data processing apparatus 4 of this embodiment includes a scalar product calculation section 50, for generating respective scalar products of the normal vector of the working region (i.e. of the pointing cursor) and the normal vectors of the polygons which represent the work object surface in the three-dimensional shape data. The embodiment further includes a surface judgement section 51, for judging whether a surface region is a front surface region or rear surface region, based on results obtained from the scalar product calculation section 50. The remaining parts of this embodiment are identical to those of the first embodiment described above, shown in FIG. 1, so that further description of these will be omitted.

Figure 13:
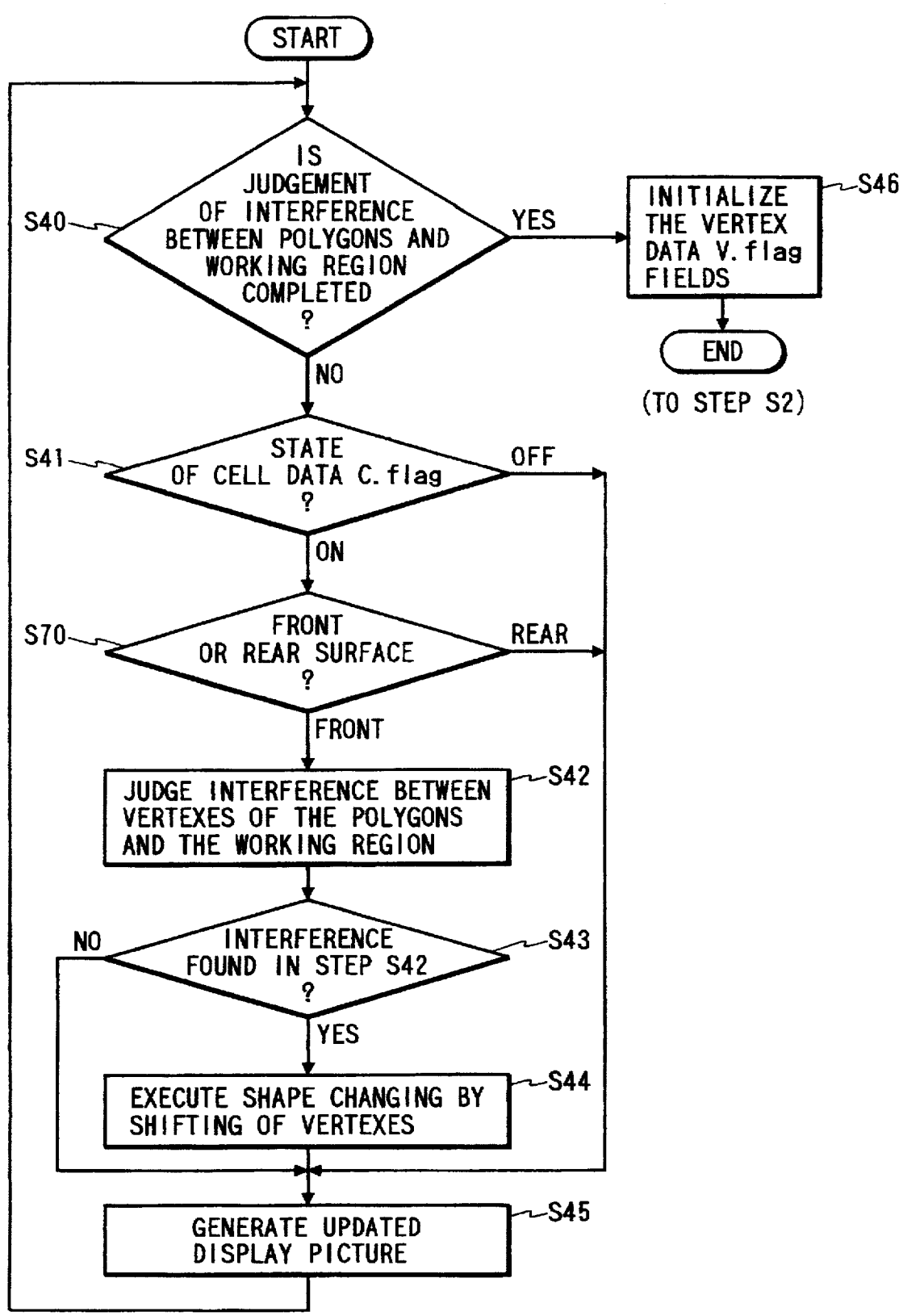
FIG. 13 is a flow diagram illustrating an operating sequence for judgement of interference between polygons and the working region, executed by the second embodiment.

The basic operation of this embodiment is in accordance with the flow chart of FIG. 4 described above. However the contents of step S4 of the flow sequence differs from that of the first embodiment (shown in FIG. 9), and is shown in FIG. 13. The loop of steps S40 to S45 in FIG. 13 is executed successively for each of the polygons of the three-dimensional shape data. These steps are as follows:

Step S40: A decision is made as to whether interference judgement with respect to the working region has been completed for all of the polygons. It that has been completed, operation then proceeds to step S46.

Step S46: All of the V.flag fields of the vertex table 23 are set to the OFF state.

If, in step S40, it is found that interference judgement has not yet been completed for all polygons, operation then proceeds to step S41.

Step S41: A decision is made as to whether the C.flag field, in the cell table 21, for the cell to which that polygon corresponds, is set to the ON state. If the flag is OFF, the operation then proceeds to step S45, and otherwise the operation proceeds to step S70.

Step S70: The scalar product calculation section 50 calculates the scalar product of the normal vector of the working region and the normal vector of the polygon. If the result is positive, then the surface judgement section 51 judges that the polygon lies on the front surface of the work object, and operation then proceeds to step S42. If the result is negative then the surface judgement section 51 judges that the polygon lies on the rear surface of the work object, and operation then proceeds to step S45.

In the following it will be assumed, for the purpose of description, that shaping is only to be applied to the front surface of the work object. However it is of course easily possible modify the flow sequence such as to perform shaping only on the rear surface.

Step S42: The working region—polygon interference judgement section 43 performs interference judgement between the working region and each vertex of the polygon.

Step S43: If no interference has been found for any of the vertexes of the polygon, operation then proceeds to S45. If interference with respect to the working region has been found for any of the vertexes of the polygon, operation then proceeds to step S44.

Step S44: The shape change processing section 44 executes updating of the values of the coordinates of the vertexes of the polygon are executed, in accordance with with the required shaping that is to be performed. In addition, the data processing section 46 recalculates the radius of the circumscribed sphere of the cell to which the polygon corresponds.

Step S45: The contents of the tables 21, 22 and 23 are updated in accordance with the values that have been obtained in the preceding steps, and a display picture showing the work object, based on the updated contents of the tables, is generated by the display terminal 3.

It will be clear that the flow diagram shown in FIG. 13 can be easily modified to provide an alternative flow sequence whereby shaping of only the rear surface of the work object (i.e. of the portion of that rear surface which lies within the working region) is performed, and that the system can be configured to respond to an input command from the user which selectively specifies either shaping of only the front surface or shaping of only the rear surface. Since such modifications are obvious, detailed description will be omitted.

Figure 14A:
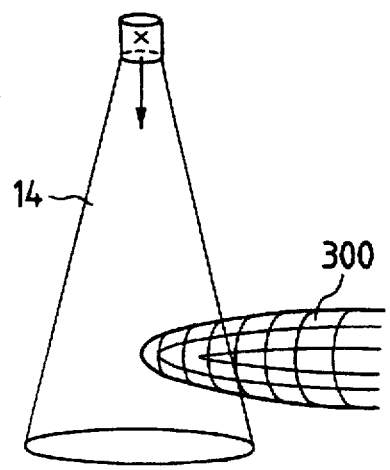
FIGS. 14A–14C show diagrams for illustrating selective shaping of front and rear surfaces of an object, executed by the second embodiment.
Figure 14B:
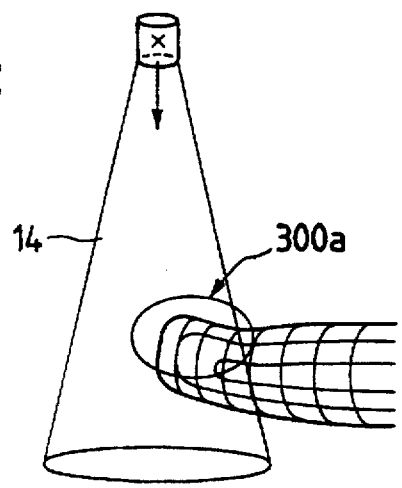
Figure 14C:
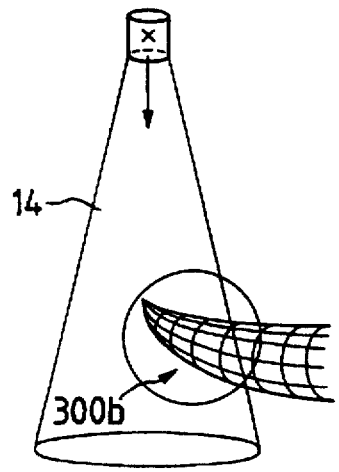

FIG. 14 shows examples to illustrate the effect of such selective shaping of only the front or only the rear surface of a work object. Diagram (A) of FIG. 14 shows a portion of a work object 300, prior to executing shaping of the portion of the work object which lies within the working region. Diagram (B) shows shaping of only the front surface of the portion of the work object surface that lies within the working region, to thereby obtain a desired shape for that portion. If however the algorithm of the second embodiment were not to be utilized, so that the same shaping processing were to be applied to both the front and rear surfaces of the portion of the work object that is within the working region, then an undesired shape would result, as illustrated in diagram (C) of FIG. 14.

It can thus be understood that this embodiment provides the user with greater freedom in effecting changes in shape of a specific region of a work object.

Figure 15:
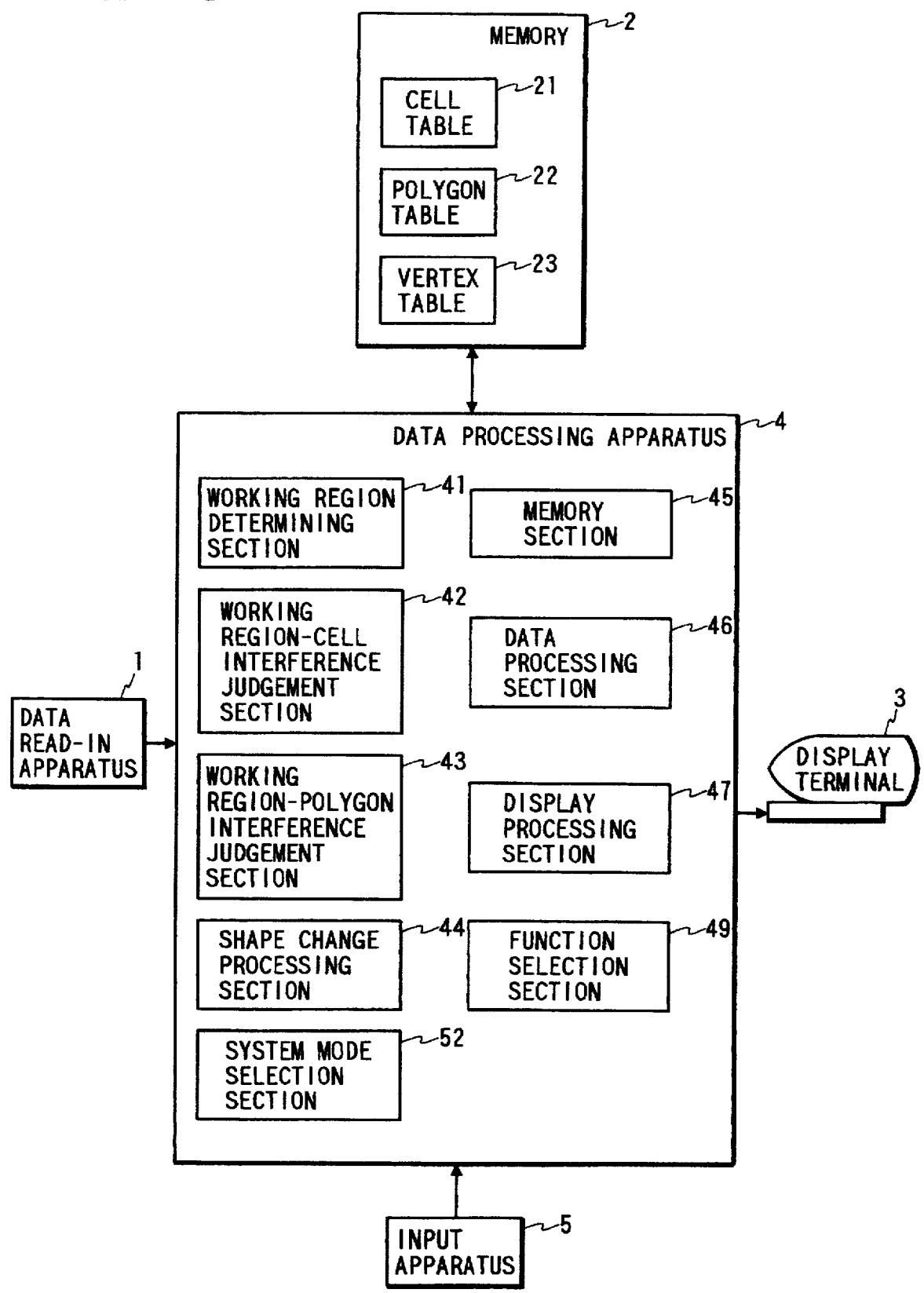
FIG. 15 is a general block diagram of a third embodiment of a three-dimensional data shaping apparatus according to the present invention.

A third embodiment of a three-dimensional data shaping apparatus according to the present invention will be described, referring first to the general block diagram of FIG. 15. This embodiment enables the user to switch between two different modes of operation, i.e. a region specifying mode which is used to specify the working region (i.e. to move the working region to a desired position in relation to the displayed work object, and thereby select a region of the work object to be subjected to shaping processing) and a shape changing mode which is used to actually effect changes in shape of the selected region of the work object. The data processing apparatus 4 of this embodiment includes a system mode selection section 52, which is responsive to a command supplied by the user through the input apparatus 5, for selecting one of the aforementioned two modes. This embodiment also differs from the first embodiment with respect to the polygon table, as described hereinafter. The remaining parts of this embodiment are identical to those of the first embodiment described above, shown in FIG. 1, so that further description of these will be omitted.

FIG. 16 shows the cell table 21, vertex table 23 and polygon table 24 of this embodiment. As shown, the polygon table 24 differs from the polygon table 22 of the first embodiment, by further including a P.flag field for each table entry. The P.flag field of a polygon is used to indicate whether interference has been found between that polygon and the working region.

Figure 17:
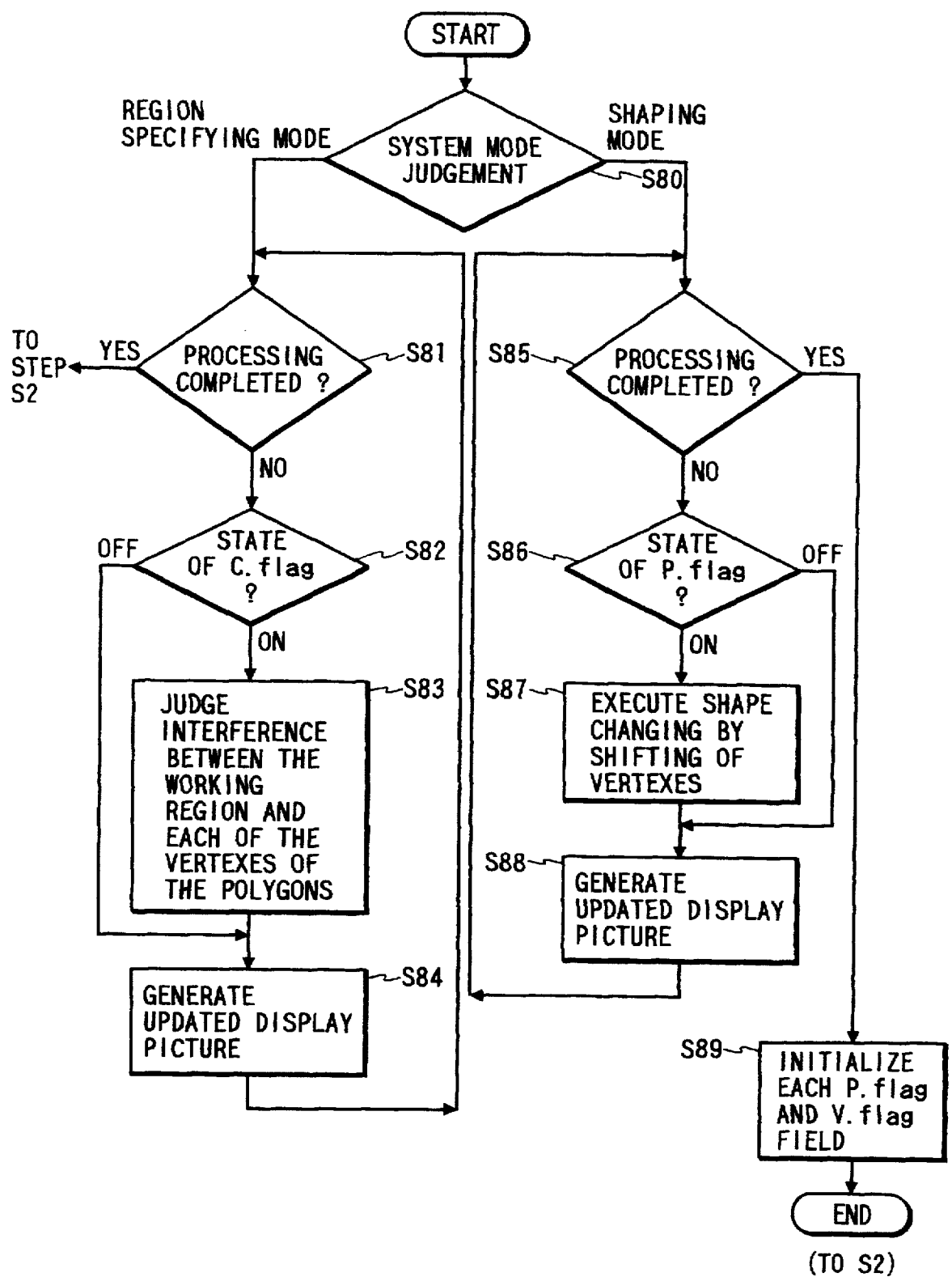
FIG. 17 is a flow diagram of a part of an operating sequence executed by the third embodiment, which enables a region of a represented work object to be selected for shaping processing, prior to actually executing the shaping processing.

The system mode selection section 52 responds to a system mode changeover command supplied by the user through the input apparatus 5, by selecting either the region specifying mode or the shape changing mode. A mode flag, whose state is set by the system mode selection section 52 to indicate the selected mode, is stored in a location of the memory section 45, i.e. the state of the flag is changed when the user designates that the mode is to be changed. The basic operation of this embodiment is in accordance with the flow diagram of FIG. 4, described above. However the operations performed in step 4 of that flow diagram differ from those of the first embodiment, and are illustrated in the flow diagram of FIG. 17. The operating steps of that diagram are as follows:

Step S80: A decision is made as to the state of the mode flag. If the flag indicates that the region specifying mode is selected, then operation proceeds to step S81. If the flag indicates that the shape changing mode is selected, then operation then proceeds to step S85.

Step S81: A decision is made as to whether judgement of interference with respect to the working region has been completed for all of the polygons of the three-dimensional shape data. If that judgement has been completed, then operation proceeds to step S2. If not yet completed, operation then proceeds to step S82.

Step S82: A decision is made as to the state of the C.flag field for the cell to which the polygon corresponds. If that flag is set to OFF, operation then proceeds to step S84, if set to ON, operation then proceeds to step S83.

Step S83: The system judges interference between the working region and each of the vertexes of the polygon. If interference is found for any of the vertexes, then the P.flag field for the polygon in the polygon table 24 is set to ON.

Step S84: Based on the contents of the tables 21, 23, 24, a display picture of the work object is generated by the display terminal 3, with each of the polygons for which the P.flag field is set to ON being distinguished, in the display picture, from the polygons for which the P.flag field is set to OFF. The respective polygons can be mutually distinguished by being displayed in two respectively different colors, or two different degrees of brightness, for example. Operation then returns to step S81.

Step S85: A decision is made as to whether shaping processing has been completed for all of the polygons for which the P.flag field is set to ON. If completed, operation then proceeds to step S89. Otherwise, operation then proceeds to step S86.

Step S86: The shape change processing section 44 judges whether the P.flag field of the polygon is set to ON or OFF. If OFF, then operation proceeds to step S88, if ON operation then proceeds to step S87.

Step S87: Changing of the coordinate values of the vertexes of the polygon are executed, in accordance with the shaping that is to be executed. In addition, the data processing section 46 recalculates the radius of the circumscribed sphere of the cell to which the polygon corresponds.

Step S88: Data in the tables 21, 23 and 24 are updated in accordance with the values obtained in the preceding steps. Based on the contents of the tables 21, 23, 24, a display picture of the work object is generated by the display terminal 3.

Step S89: Each of the P.flag fields in the polygon table 24 and V.flag fields in the vertex table 23 is initialized, by setting to the OFF state.

On completion of step S89, operation then proceeds to step S2 of FIG. 4.

With this embodiment, the user can select from two system modes. With the region specifying mode established, the user can (by moving the pointing cursor, and hence the working region) determine the region of the work object which is to be subjected to shaping. That region of the work object is clearly distinguished, in the display picture generated by the display terminal 3, from the remainder of the work object, so that the user can accurately specify the desired region. The user can then input a command to establish the shape changing mode, in which shaping of the specified region of the work object is executed. This embodiment therefore provide improved ease of use and greater precision in selecting a desired region which is to be shaped.

Figure 18A:
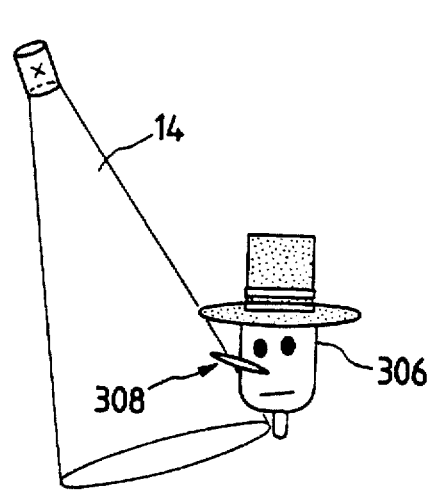
FIGS. 18A–18C show diagrams of an example of region selection and shaping, executed by the third embodiment.
Figure 18B:
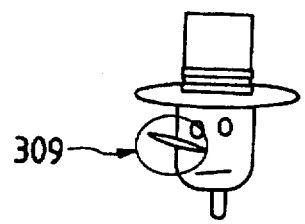
Figure 18C:
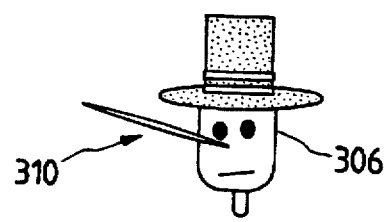

A simple example to illustrate the use of this embodiment is shown in FIG. 18. It is assumed that only the nose 308 of the model head 306 shown in diagram (A) of FIG. 18 is to be subjected to shaping processing. Firstly, the user establishes the region specifying mode, and then moves the pointing cursor 14 until only the nose 308 is within the working region, i.e. a region 309 containing the nose 308 is positioned within the working region, as illustrated in diagram (B) of FIG. 18. In that condition, the nose 309 becomes displayed (for example, at a higher display brightness level) such as to be clearly distinguished from the remaining parts of the head 306. The user can thereby immediately confirm that the required region of the work object has been accurately selected for shaping. The user then inputs a command to establish the shape changing mode, whereupon the shape of the nose 309 is changed to a new shape 310, in accordance with the shaping processing that has been specified beforehand.

Figure 19:
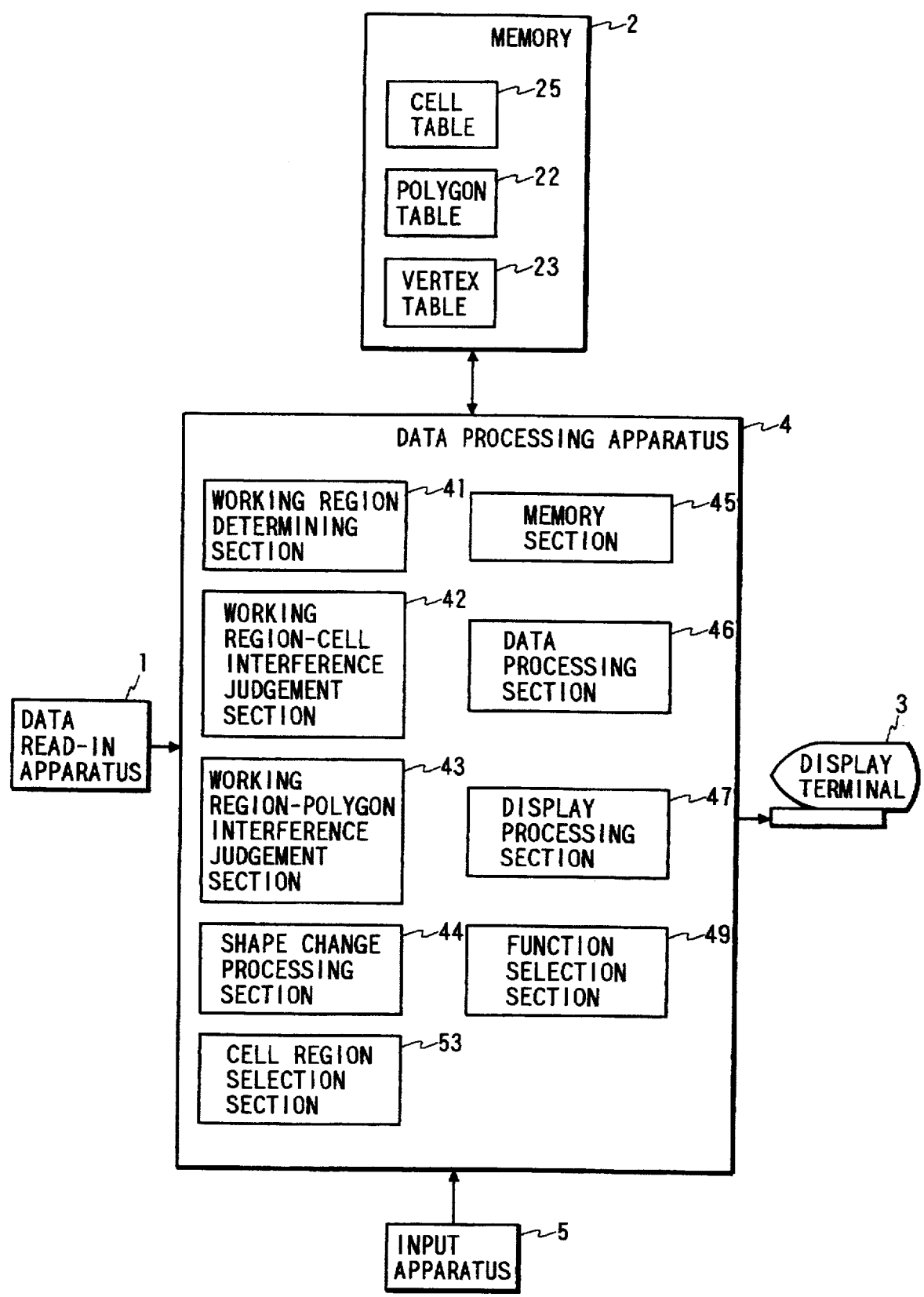
FIG. 19 is a general block diagram of a fourth embodiment of a three-dimensional data shaping apparatus according to the present invention.

A fourth embodiment of a three-dimensional data shaping apparatus according to the present invention will be described, whereby it is possible to selectively display the contents of only some of the cells, i.e. only those cells which contain polygons which are to be subjected to shaping processing. The basic configuration of this embodiment is shown in the block diagram of FIG. 19. The data processing apparatus 4 of this embodiment includes a cell region selection section 53, for selecting a cell region, as described hereinafter. In addition, the cell table 25 of this embodiment differs from the cell table 21 of the first embodiment in that a C_rgnflag field is provided for each entry. The remaining parts of this embodiment are identical to those of the first embodiment described above, shown in FIG. 1, so that further description of these will be omitted.

Figure 21:
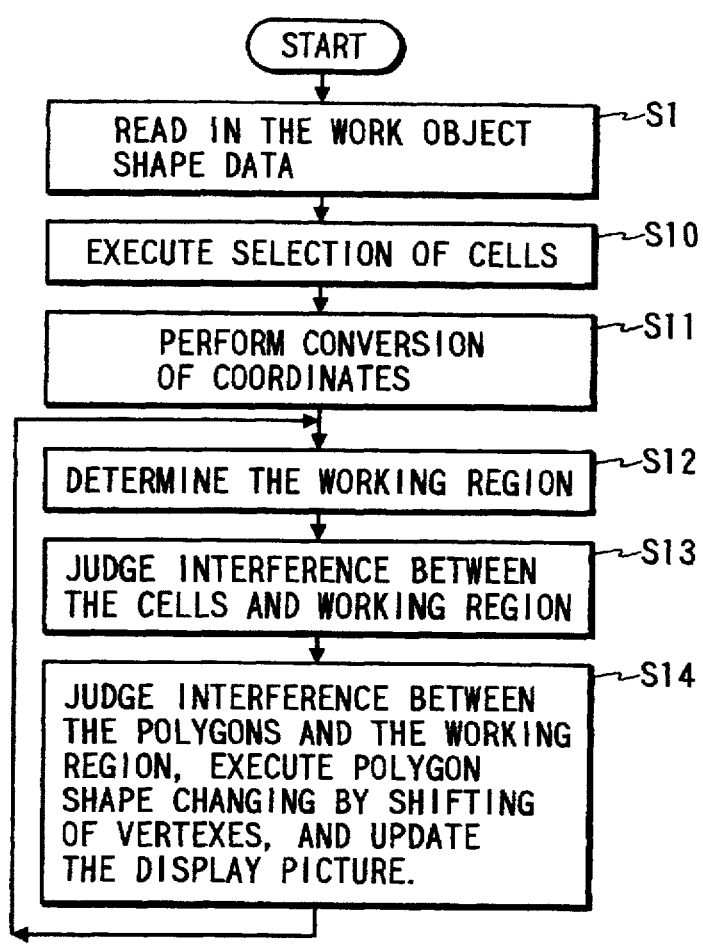
FIG. 21 is a flow diagram showing the basic operating sequence of the fourth embodiment.
Figure 22:
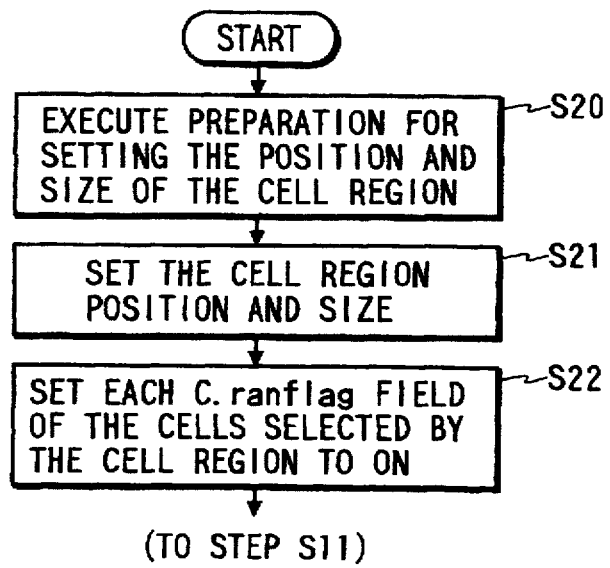
FIG. 22 is a flow diagram showing an operating procedure for selecting a set of cells.
Figure 23A:
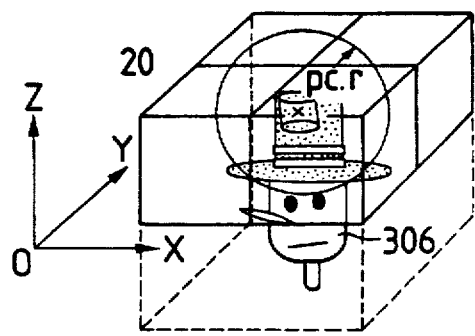
FIG. 23A–23D show diagrams of an example of utilizing the fourth embodiment in shaping a selected region of a work object.
Figure 23B:
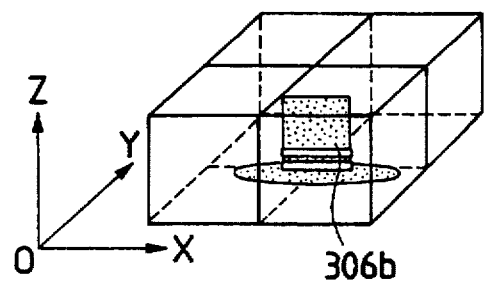
Figure 23C:
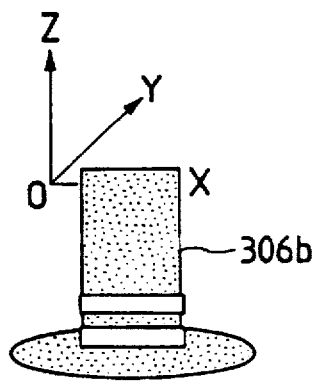
Figure 23D:
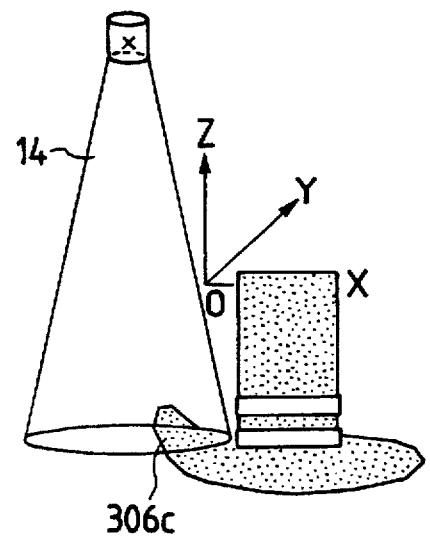

FIG. 20 shows the tables which are stored in the memory 2 of this embodiment. These are a cell table 25, a polygon table 22 and vertex table 23. The operation of the embodiment will be described referring to the flow diagrams of FIGS. 20 and 21. In this embodiment, it is assumed that the pointing cursor position information (supplied by the user as described for the preceding embodiments) can be used to specify the position of either the cell region or of the working region, in two respective operation modes. However for brevity of description, details of mode changeover are omitted from the flow diagrams. The embodiment is selectively operable in a mode in which the position of the cell region can be varied by the user The operating sequence is as follows:

Step S1: The three-dimensional shape data representing the work object are read in from the data read-in apparatus 1, and stored in the tables 22, 23 and 25 of the memory 2. Based on the data stored in the memory 2, the display processing section 47 supplies display data to the display terminal 3, for generating a display picture showing the work object. This step is similar to step S1 in the flow diagram of FIG. 4, for the first embodiment. Operation then proceeds to step S10.

Step S10: The display terminal 3 selects specific cells, by executing a procedure shown in the flow diagram of 20. This procedure is as follows:

Step S20: The system defines a three-dimensional region of predetermined size (referred to in the following as the cell region) within the three-dimensional space, with that cell region being in the form of either a sphere or a cube, and being centered on a point whose coordinates are designated as (pc.x, pc.y, pc.z). If the cell region is a sphere, then the radius of that sphere is designated as pc.r, and if the cell region is a cube, then the length of ½ of each side of the cube is designated as pc.r. The cell region is defined, and a corresponding cursor representing the cell region is generated in the display picture produced by the display terminal 3. The cell region can be moved in the reference three-dimensional space by varying the position data supplied by the user through the input apparatus 5, in the same way as for moving the working region with the preceding embodiments, and can also be varied in size by supplying input information to change the value of the parameter pc.r. An example is shown in diagram (A) of FIG. 23, in which the cell region 20 is spherical and is movable within the three-dimensional space containing a work object 306.

Step S21: In response to input information from the user supplied through the input apparatus 5, the cell region is moved to an appropriate position, and is varied in size to an appropriate value, for selecting one or more of the cells. It will be assumed that if at least of a part of a cell lies within the cell region, then the cell is selected. In diagram (B) of FIG. 2 for example, the four cells containing the hat portion of the work object 306 have been selected (i.e. the cells to which the polygons representing the surface of the hat correspond).

Step S22: The C_rgnflag field in the cell table 25 of each cell selected in step S21, i.e. each cell which falls at least partially within the cell region, is set to the ON state. Operation then proceeds to step S11 of FIG. 21. In the example of FIG. 23, each cell which contains a part of the hat portion 306b of the work object has the C_rgnflag thereof set to ON, as diagram (B).

Step S11: The selected cells are moved to a central region of the display picture, and expanded in size. As a result, the position coordinates of the contents (i.e. part of the work object) within the selected cell or cells are changed such as to expand the size of the contents, and move the contents to the center of the display picture. In FIG. 23, the selected portion 306b is thus shifted and expanded, as shown in diagram (C). In this condition, the user can input a command to designate changeover to a mode in which position information, supplied through the input apparatus 5, determines the position of the working region, as described above for the first embodiment. In that case, operation then proceeds to step Step S12.

Step S12: The pointing cursor 14 representing the working region is moved to a position determined by the position data, to select a region of the (expanded size) work object portion that is to be subjected to shaping.

Step S13: The system judges interference between the cells and the working region.

Step S14: For each of the cells for which interference has been found in step S13, interference judgement with respect to the working region is performed for each of the polygons corresponding to the cell. Shifting of the vertexes (in accordance with the required shaping) is executed for each of the polygons for which interference is found, the contents of tables 22, 23, 25 are updated accordingly, and an updated display picture is generated based on the contents of the tables. The resultant display picture can for example as shown in diagram (D), for the example of FIG. 23, with shaping having been executed of a region 306c of the selected portion 306b of the work object. Operation then returns to step S12.

It can be understood that the above embodiment provides advantages to the user when operating on a large and complex work object, since an arbitrary portion of the work object can be selected to be displayed in expanded size at the center of the display, so that shaping processing can then be performed on the selected portion with speed and accuracy.

Moreover, the total number of polygons which must be displayed (to represent the selected portion of the work object) can be substantially smaller than the number of polygons used to represent the entire work object. Hence, less time is required for the system to update the display picture each time a new shaping operation is performed, so that an improved speed of response to input commands supplied by the user can be achieved.

Figure 24:
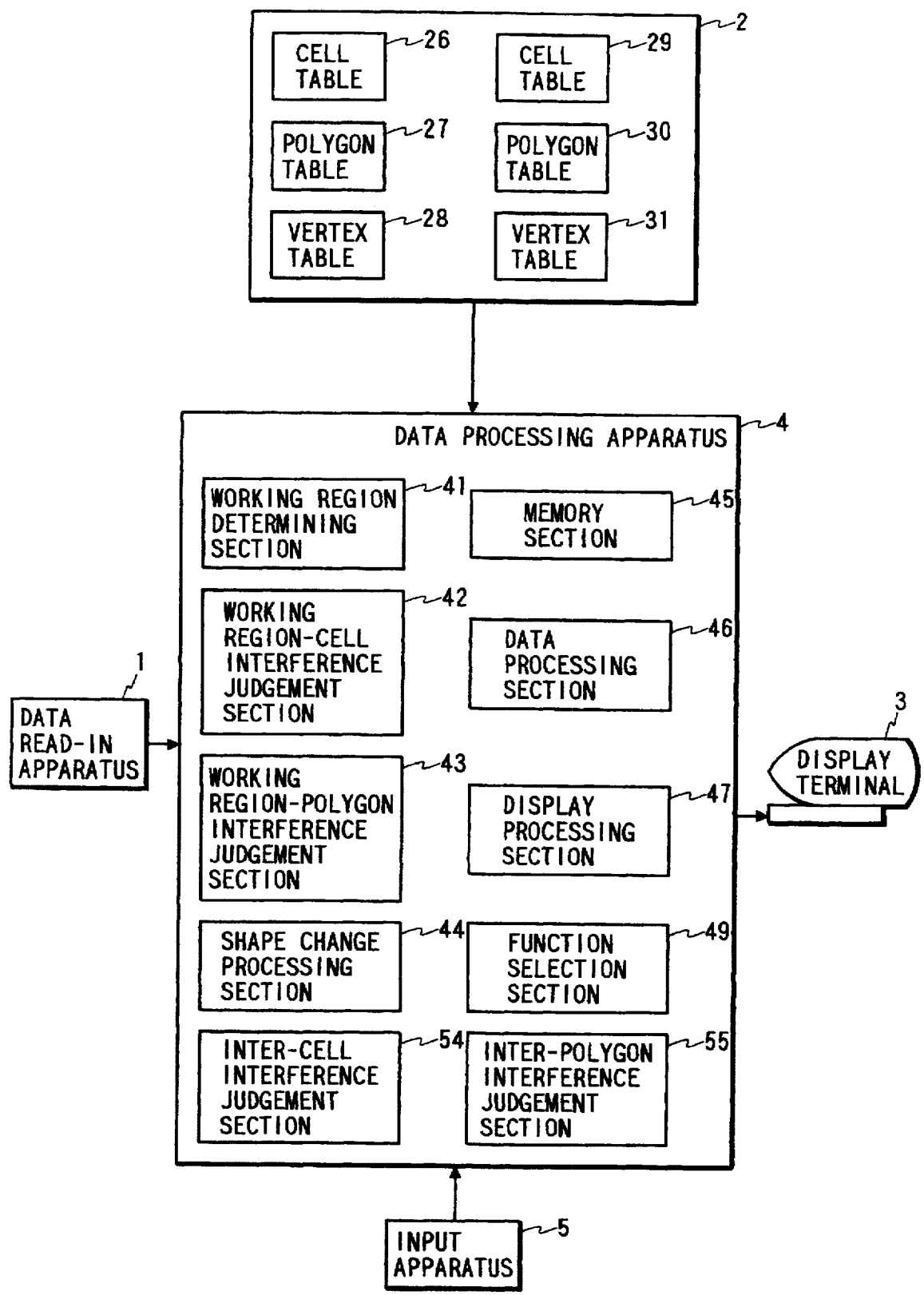
FIG. 24 is a general block diagram of a fifth embodiment of a three-dimensional data shaping apparatus according to the present invention.

A fifth embodiment of a three-dimensional data shaping apparatus according to the present invention will be described, which enables judgement of interference between a plurality of work objects, in addition to the capability for shaping a selected region of a work object. For simplicity of description, it will be assumed that only two work objects are operated on, although the invention is not limited to such a number. More specifically, this embodiment enables the user for example, while observing the display picture, to move one work object to an exact position at which contact occurs with a second work object (i.e. the position at which interference occurs between the two work objects as represented by three-dimensional shape data). When that exact point of contact occurs, the user is notified by the system, for example by a message which is generated in the display picture. The embodiment will be described for the case of operating on a first and a second work object, although this aspect of the invention is applicable to a greater number of work objects. The general configuration of this embodiment is shown in the block diagram of FIG. 24. The data processing apparatus 4 of this embodiment differs from that of the first embodiment by further including an inter-cell interference judgement section 54, which is used for judgement of interference between cells which contain a first work object and cells which contain a second work object, and an inter-polygon judgement section 55 which is used for judgement of interference between the polygons representing the first work object and the polygons representing the second work object. In addition, the memory 2 of this embodiment has stored therein a cell table 26, a polygon table 27 and a vertex table 28 for storing data relating to the first work object, as FIG. 25A and a cell table 29, a polygon table 30 and a vertex table 31 for storing data relating to the second work object, as shown in FIG. 25B. The remaining parts of this embodiment are identical to those of the first embodiment described above, shown in FIG. 1, so that further description of these will be omitted.

Referring to FIGS. 25A,25B, the polygon table 27 and vertex table 28 only have entries for the polygons and vertexes of the first work object, and the contents of the cell table 26 are determined by those of the polygon table 27. Similarly, the polygon table 30 and vertex table 31 only have entries for the polygons and vertexes of the second work object, and the contents of the cell table 29 are determined by those of the polygon table 30. Other than that, each of the two sets of tables is of identical configuration to the set of tables 21, 22, 23 of the first embodiment.

Figure 27:
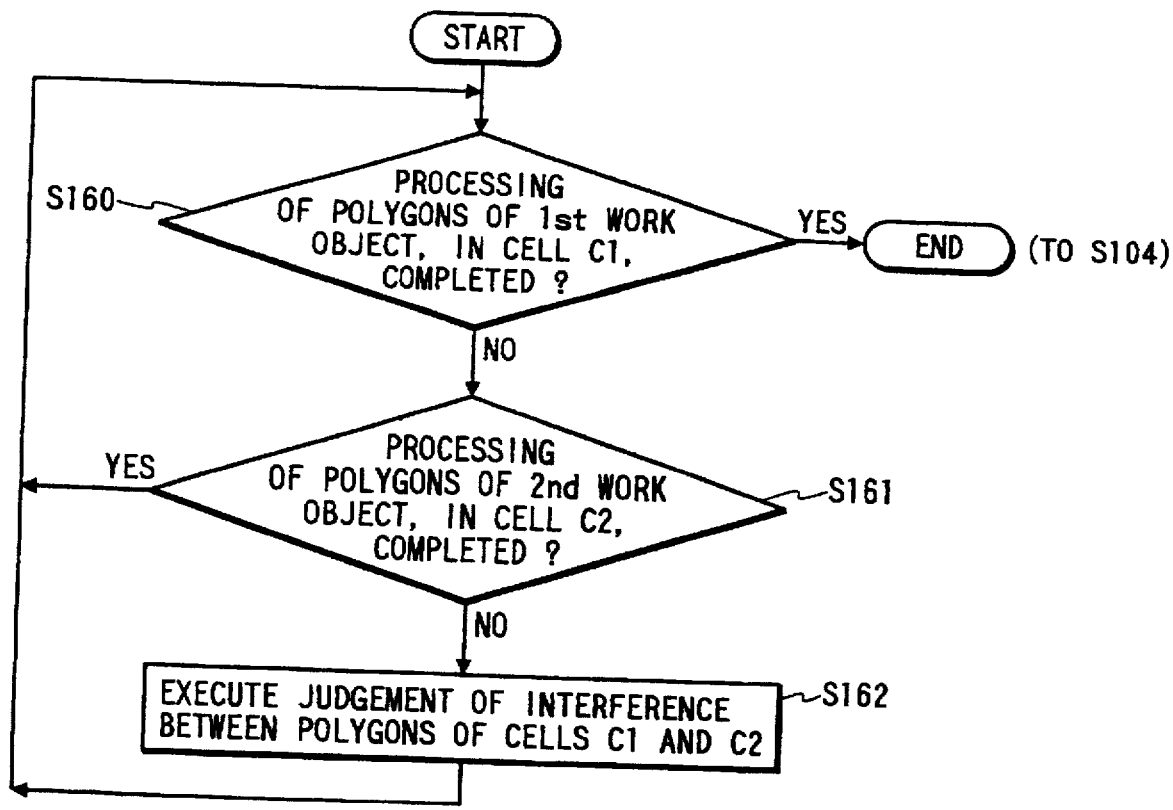
FIG. 27 is a flow diagram of a procedure within the sequence of FIG. 26, for judging interference between polygons representing a first work object and polygons representing a second work object.

The operation will be described referring to the flow diagrams of FIGS. 26 and 27, in conjunction with the operation example shown in FIG. 29. The procedure is as follows:

Step S101: The three-dimensional shape data for each of the first and second work objects are read in from the data read-in apparatus 1, and respective data items for the first and second work objects are stored in respective fields of the tables 26 to 28 and tables 29 to 31. Based on the contents of these tables, the display processing section 47 provides display data to the display terminal 3 for generating a display picture showing the first and second work objects, such as that shown in diagram (A) of FIG. 29.

Step S102: The user can designate that one of the work objects is to be displaced, for example is to be moved towards the other work object, and can then effect such displacement. The designation of a work object can for example be performed by using a pointing device such as a mouse, of the input apparatus 5, to move the pointing cursor 14 such as to bring the desired work object within the working region, and then inputting a predetermined command, through the input apparatus 5, to indicate that the work object has been designated for displacement. With this embodiment of the invention, the designated work object can then be displaced within the reference three-dimensional space by the user inputting changes in the position data, through the input apparatus 5, to move the pointing cursor 14. In the example of FIG. 29, it is assumed that the work object 202 is designated, and is to be moved downward.

Specifically, the displacement of a designated work object is achieved as follows. The memory section 45 of the data processing apparatus 4 has predetermined locations for storing displacement values which express an amount of change in the position of each work object in relation to the origin point of the three-dimensional coordinate system 10 i.e. amounts of change in position of the work object with respect to an initial position at the time of starting operation of the system. For example for the first work object, these displacement values are designated as Trans1.x, which is an amount of displacement along the x-axis, and Rot1.x which is an amount of rotation about the x-axis, Trans1.y, which is an amount of displacement along the y-axis, and Rot1.y which is an amount of rotation about the y-axis, and Trans1.z, which is an amount of displacement along the z-axis, and Rot1.z which is an amount of rotation about the z-axis. Initially, each of these displacement values is 0.

When the user moves the pointing cursor 14 by inputting a change in the position data, then respective amounts of change in the displacement values occur for the designated work object, in accordance with the change which has occurred in the position data. At the next execution of step S102, based on the updated displacement values, new values are calculated for the coordinates of the vertexes of the designated work object, and the contents of the cell table, polygon table and vertex table of that work object are accordingly updated. Based on the table contents, an updated display picture is then generated by the display terminal 3 (as a result of executing a step S107 described hereinafter, in the flow sequence subsequent to step S102), showing the designated work object at its changed position. The user can thus freely move the designated work object, by utilizing a pointing device such as a mouse, as an input device.

Step S103: In the first execution of this step, the cell data for the leading entry (C1.no 1) in the cell table 26 are read out from that table.

Step S104: In the first execution of this step, the cell data for the leading entry (C2.no 1) in the cell table 29 are read out from that table.

Step S105: In the first execution of this step, the inter-cell interference judgement section 54 judges interference between the cells C1.no 1 and C2.no 1. For example in diagram (B) of FIG. 29, there is interference found between the cell 300 which contains the work object 202 and the cell 301 which contains a portion of the work object 201. If interference is found, operation then proceeds to step S106, and otherwise processing returns to step S104.

Step S106: If there is interference between these cells, then the inter-polygon judgement section 55 judges whether there is interference between any of the the polygons which correspond to one of these cells and the polygons which correspond to the other of the two cells. Thus, the system judges whether there is interference between the two work objects. If interference is found, the system generates an indication on the display picture, such as a text message, to notify the user. Operation then returns to step S104.

The sequence of steps S104 to S106 are then repeated for the leading cell entry C1.no 1 of the cell table 26 and the second cell entry C2.no 2, and so on successively for each of the entries in the cell table 29, up to the final entry (C2.MAX). Operation then returns to step S103, and the sequence of steps S104 to S106 is executed for the second entry (C1.no 2) of the cell table 26 and each of the entries in the cell table 29, and so on for all of the entries in the cell table 26. In that way, by cyclical repetitions of steps S103 to S106, interference judgement is executed for all of the possible combinations of the cell data entries (C1.no 1 to C1MAX) in the cell table 26 with all of the cell data entries (C2.1 to C2MAX) in the cell table 29. In each execution of the sequence of steps S104 to S106, in step S103, a decision is made as to whether all of the entries in the cell table 26 have been processed. If so, operation then proceeds to step S107, and the display terminal 3 generates a display picture based on the contents of the tables 26 to 31, showing the current positions of the work objects. If not, operation then proceeds to step S104.

The processing performed in step S105 will be described in more detail in the following. To simplify the description, an arbitrary cell having polygons of the first work object corresponding thereto will be referred to as C1, and an arbitrary cell having polygons of the second work object corresponding thereto will be referred to as C2. Firstly, designating the coordinates of the centroid of cell C1 as (C1.x, C1.y, C1.z) and the coordinates of the centroid of cell C2 as (C2.x, C2.y, C2.z), the distance Rcell between these centroids is obtained from the following equation 19:

$$Rcell = \sqrt{((C1.x - C2.x)^2 + (C1.y - C2.y)^2 + (C1.z - C2.z)^2)} \quad (19)$$

Next, the radiuses C1.r and C2.r of t-he respective circumscribed spheres of the respective sets of polygons corresponding to the cells C1, C2 are added together to obtain a value Cdist, i.e.:

$$Cdist = C1.r + C2.r \quad (20)$$

The values of Rcell and Cdist are then compared, i.e. a judgement is made as to whether the following relationship is satisfied:

$$Rcell > Cdist \quad (21)$$

If condition 21 above is satisfied, i.e. Rcell is greater than Cdist, then this indicates that there is interference between the cells C1, C2.

Step S106, for judgement of interference between the polygons of the two work objects (i.e. interference between respective sets of polygons corresponding to two cells for which mutual interference has been found in step S105) will be described referring to the flow diagram of FIG. 27. The operations performed are as follows:

Step S160: The data for the polygons which correspond to a cell C1 (for it is assumed that interference has been found in step S105 with respect to cell C2) are successively read out from the polygon table 27 and sent to the inter-polygon judgement section 55.

Step S161: The data for each of the set of polygons which correspond to the cell C2 are successively read out from the polygon table 30 and sent to the inter-polygon judgement section 55.

Step S162: The inter-polygon judgement section 55 judges whether there is interference between any of the polygons of cell C2 and the polygons of cell C1.

By repetitions of steps S160 to S162, interference judgement is performed in step S162 for all of the possible combinations of pairs of polygons that correspond to the cells C1 and C2 respectively.

Specifically, in step S160 of obtaining the polygon data of a cell C1, the following operations are performed. The value in the C1.adr field of cell C1 are used as an initial entry address (P1.no) in the polygon table 27. The data of the set of entries in the polygon table 27 which correspond to the cell C1 are read out successively, from that initial entry, up to the final entry of the set, which has the entry address (C1.adr+C1.numeral).

Similarly, in step S161 of obtaining the polygon data of a cell C2, the following operations are performed as follows. The C2.adr entry address in the cell table 29 for the cell C2 is used as an initial entry address (P2.no) in the polygon table 30. The data of the set of entries in the polygon table 30 which correspond to the cell C2 are read out successively, beginning from that initial entry, up to the final entry of the set, which has the entry address (C2.adr+C2.numeral).

It it is found in step S162 that there is interference between any polygon of cell C1 and any polygon of cell C2, then the system generates an indication such as a text message on the display terminal 3, to inform the user that interference between the first and second work objects has been found.

Upon completion of judgement of interference between polygons, for all of the possible combinations of pairs of polygons of the cells C1 and C2 respectively, operation then proceeds to step S104, operation then proceeds to via step S104 and step S103 to step S107, in which the contents of the polygon tables 27 and 30 are successively read out and supplied to the display processing section 47, whereby images of the first and second work objects in their current positions are generated in the display picture by the display terminal 3.

Figure 29A:
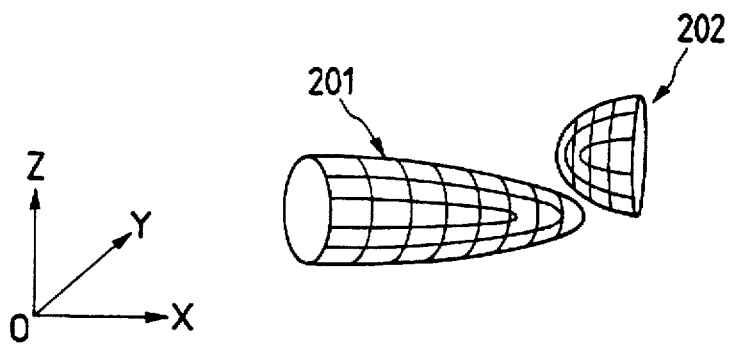
FIGS. 29A–29C show examples of interference judgement between two represented work objects, executed by the fifth embodiment and by the modification of the fifth embodiment, respectively.
Figure 29B:
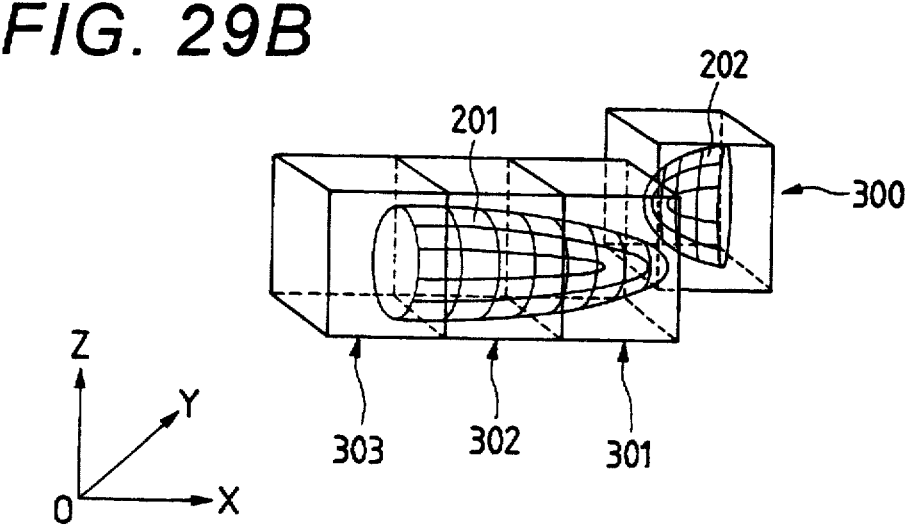
Figure 29C:
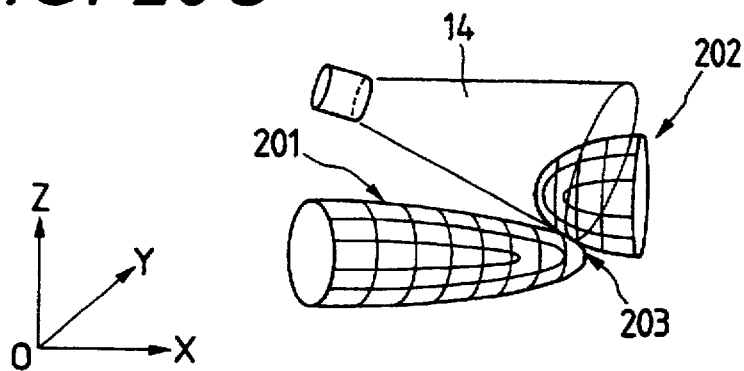

Referring again to diagram (B) of FIG. 29, interference is found between the cells 300, 301 to which the polygons of work object 202 and part of the polygons of work object 201 respectively correspond. Since there is no interference between cell 300 and either of cells 302, 303 (to which the remainder of the polygons of work object 201 correspond), it becomes possible to omit the execution of interference judgement between the contents of cells 302, 303 and the polygons of work object 202. Hence a significant reduction can be achieved in the amount of processing that is necessary for performing interference judgement between a plurality of work objects, by comparison with a prior art type of such an apparatus. In the case of a prior art apparatus, it would be necessary to examine all of the possible combinations of pairs of polygons constituting all of the work objects. However with the present invention, judgement of interference between cells which correspond to one work object and cells which correspond to another work object is performed as an initial processing stage. As a result, the total amount of necessary processing can be reduced, so that a higher speed of system operation is achieved, and the system becomes more rapidly responsive to input operations executed by the user, i.e. for displacing one work object in relation to another.

It can be understood that the above embodiment will be useful for example in examining the shape relationships between a mold and an article which is to be formed by using the mold, since the article can be displayed (as a first work object) within the interior of the mold (as a second work object) and changes in the state of interference between them (i.e. when one is displaced in relation to the other) can be observed in real time.

Although the above embodiment has been described for the case of operating on two work objects, it will be clear that the embodiment can easily be modified to enable judgement of interference between a greater number of work objects.

Figure 26:
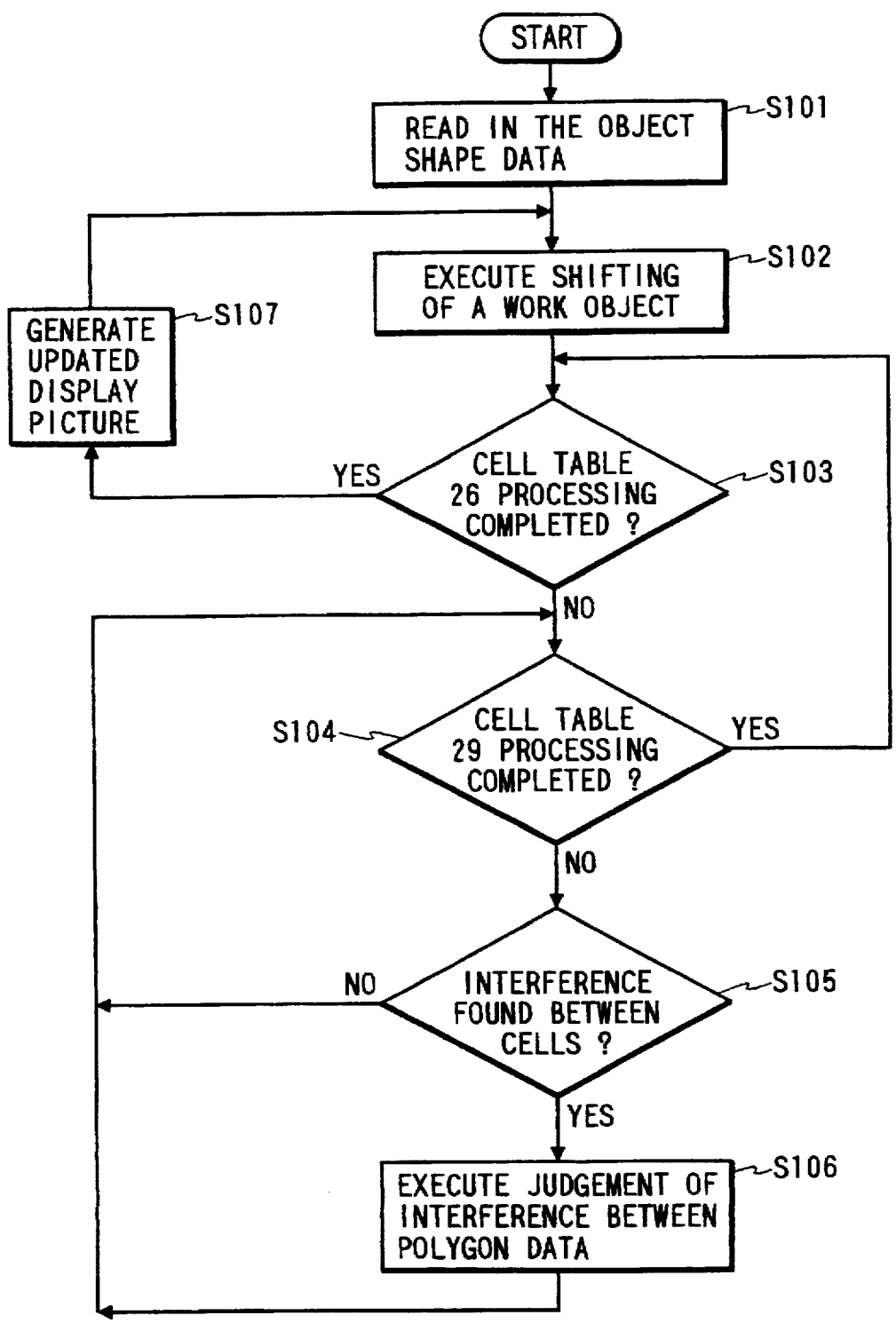
FIG. 26 is a flow diagram showing the operating sequence of the fifth embodiment of a three-dimensional data shaping apparatus according to the present invention.

Although the fifth embodiment has been described above for the case of executing only displacement of a work object, it is also possible to execute shaping of one of the work objects in step S102 of FIG. 26. With such a mode of operation, the user first executes shape changing of one of the work objects, by inputting position data such as to move the pointing cursor 14 to place within the working region the part of the desired work object which is to be changed in shape. Such shape changing is performed in the same way as described hereinabove for the first embodiment. The system then judges interference between the working region and the cells, and then judges interference between the working region and the polygons of a cell for which interference has been found in the preceding step. Then (in accordance with the specified shaping), the processing described hereinabove for step S4 of the first embodiment, shown in FIG. 4, is executed. The contents of the cell table, polygon table and vertex table for the designated work object are then updated accordingly. Thereafter, judgement of interference between the work objects is performed as described above, by executions of steps S103 to S106, and the display picture is updated in step S107, showing the change in shape. The effect obtained is illustrated in diagram (C) of FIG. 29. In that example, the work object 202 shown in diagram (A) is changed in shape. When interference between two work objects is detected, in a region 203, then a display indication is generated as described above for the fifth embodiment.

Figure 28:
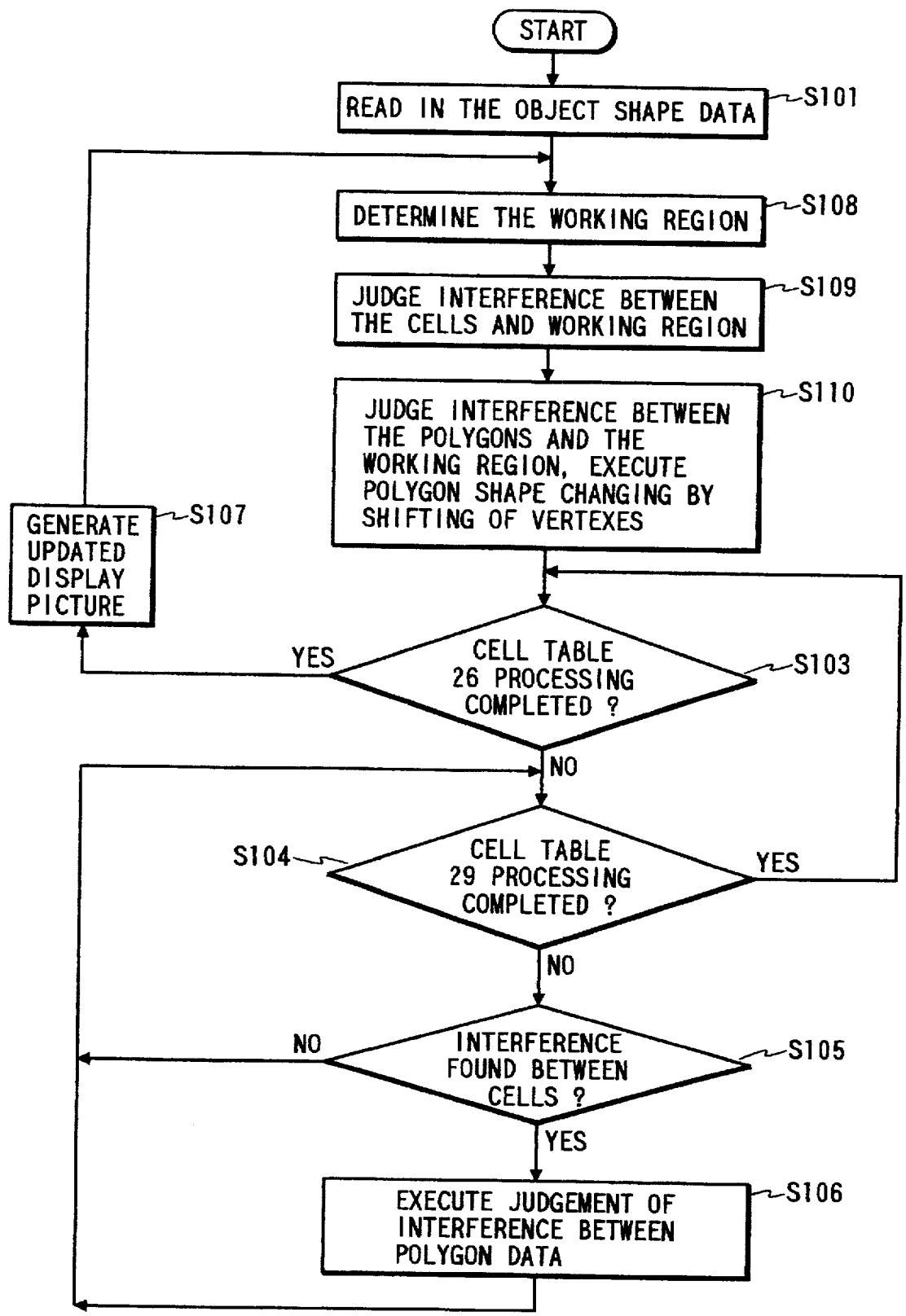
FIG. 28 is a flow diagram showing the operating sequence of a modification of the fifth embodiment.

A flow diagram for such a modification of the fifth embodiment is shown in FIG. 28. The contents of steps S108, S109 and S110 respectively correspond to those of steps S2, S3 and S4 of the first embodiment, shown in FIG. 4. During execution of these steps, the C1.flag and C2.flag fields of the cell tables 26, 27 are used in a similar way to the C.flag fields of cell table 21 of the first embodiment. Prior to completion of changing of the shape of the region of a work object lying within the working region, in step S110, the C1.flag and C2.flag fields have been initialized to the OFF state, and so can then be used again in the subsequent processing of steps S103 to S106.

The above modification of the fifth embodiment therefore enables a user to perform input operations in real time, to effect changes in the shape on one work object, while observing any occurrence of interference between that work object and one or more other work objects, which may result from the shape changes.

It will be apparent that the fifth embodiment can easily be modified to enable the user, acting through the input apparatus 5, to specify either an operating mode in which displacement of a designated work object is to be performed in step S102 and a mode in which shaping of a selected region of a specific work object is to be performed in step S102. Detailed description is therefore omitted.

From the above description of embodiments, it can be understood that with the first through fourth embodiments of a three-dimensional data shaping apparatus according to the present invention, it becomes possible to execute judgement of interference between a body which is represented by data within a three-dimensional space and a specified region (i.e. the working region) within that three-dimensional space, with the interference judgement being performed in two successive stages. In a first stage, judgement is made of interference between respective small regions, i.e. cells, into which the three-dimensional shape data is divided, and the specified region. In a second stage, judgement is executed of interference between the specified region and only those elements of the represented body which lie within the small region (or regions) for which interference with respect to the specified region has been found in the first stage. As a result, the total number of interference judgement operations can be substantially reduced, by comparison with a prior art type of three-dimensional data shaping apparatus whereby it is necessary to execute interference judgement for all of the constituent elements (e.g. polygons) which represent the body. Hence, a higher speed of processing can be achieved, and hence a higher speed of response to input operations by the user, can be achieved. The user is thereby enabled to confirm the results of input operations, such as shaping operations performed on a work object, by observing the effects of such input operation on a display picture, in real time.

Furthermore with the fifth embodiment of the invention, it becomes possible for a user to move a work object with respect to another work object, or to change the shape of a work object which is positioned adjacent to another work object, while the system executes processing for detecting the occurrence of interference between them, and notifies the user when such interference occurs. In a first stage of the operation, judgement is performed of interference between cells containing polygons of one work object and cells containing polygons of another work object, and in a second stage of the operation, judgement is performed of interference between only the polygons corresponding to cells for which mutual interference has been found in the first stage of operation. Hence, rather than performing interference judgement between work objects based on all of the constituent elements representing these work objects, the judgement is performed using only a part of the constituent elements, so that increased processing speed is achieved.

What is claimed is:

1. A three-dimensional data shaping apparatus for processing three-dimensional shape data which represent a shape of an object in relation to a reference three-dimensional space, to execute a predetermined shaping operation, said three-dimensional shape data representing the surface of said object as a plurality of two-dimensional constituent elements, said apparatus comprising:

input means for generating working region position data, operable for controllably varying said working region position data;

working region determining means for generating working region data representing a working region as a specific region within said reference three-dimensional space, responsive to said working region position data for controlling at least the position of said working region within said reference three-dimensional space;

processing means for determining respective position correspondences between said two-dimensional constituent elements and a plurality of small regions of said reference three-dimensional space;

memory means for storing data expressing said position correspondences;

first interference judgement means for judging for each of said small regions, based on said working region data and said position correspondences, whether there is interference between said small region and said working region;

second interference judgement means for judging, for each of said small regions for which interference with respect to said working region is found by said first interference judgement means, whether there is interference between said working region and at least one of said two-dimensional constituent elements which corresponds to said each small region; and shape change means for operating on said three dimensional shape data in accordance with said shaping operation, to change respective shapes of each of said two-dimensional constituent elements for which interference with respect to said working region is found by said second interference judgement means.

2. An three dimensional data shaping apparatus according to claim 1, wherein said first interference judgement means executes said judgement of interference between said working region and one of said small regions by judging whether there is interference between said working region and a circumscribed sphere which contains all of said two-dimensional constituent elements which corresponds to said one of the small regions.

3. A three-dimensional data shaping apparatus according to claim 1, further comprising display means responsive to said three-dimensional shape data and said working region data for generating a display picture showing said object and said working region respectively within said reference three-dimensional space.

4. A three-dimensional data shaping apparatus according to claim 1, further comprising function selection means controllable for selecting one of a plurality of mathematical functions, wherein said shaping operation is determined in accordance with a mathematical function selected by said function selection means.

5. A three-dimensional data shaping apparatus according to claim 1, wherein respective locations in said memory means are preassigned as respective flags for each of said small regions, wherein said processing means is responsive to said first interference judgement means for setting a flag of a small region to a predetermined state when interference is found between said small region and said working region, and wherein said second judgement means is controlled to judge interference only between said working region and respective ones of said two-dimensional constituent elements which correspond to a small region for which a corresponding one of said flags has been set to said predetermined state.

6. A three-dimensional data shaping apparatus according to claim 1, wherein respective locations in said memory means are preassigned as respective flags for each of said two-dimensional constituent elements, wherein said processing means is responsive to said second judgement means for setting to a predetermined state each of said flags which correspond to a two-dimensional constituent element for which interference with respect to said working region has been found, and wherein said shape changing means executes said shape changing of only respective ones of said two-dimensional constituent elements for which the corresponding one of said flags has been set to said predetermined state.

7. A three-dimensional data shaping apparatus for processing three-dimensional shape data which represent a shape of an object in relation to a reference three-dimensional space, to execute a predetermined shaping operation, said three-dimensional shape data representing said shape as a plurality of constituent elements, said apparatus comprising:

input means for generating working region position data, operable for controllably varying said working region position data;

working region determining means for generating working region data representing a working region as a specific region within said reference three-dimensional space, responsive to said working region position data for controlling at least the position of said working region within said reference three-dimensional space;

processing means for determining respective position correspondences between said constituent elements and a plurality of small regions of said reference three-dimensional space;

memory means for storing data expressing said position correspondences;

first interference judgement means for judging for each of said small regions, based on said working region data and said position correspondences, whether there is interference between said small region and said working region;

second interference judgement means for judging, for each of said small regions for which interference with respect to said working region is found by said first interference judgement means, whether there is interference between said working region and at least one of said constituent elements which corresponds to said each small region; and shape change means for operating on said three dimensional shape data in accordance with said shaping operation, to change respective shapes of each of said constituent elements for which interference with respect to said working region is found by said second interference judgement means, wherein said working region data include data defining a first normal vector which indicates a direction of orientation of a predetermined axis of said working region, wherein each of said constituent elements are two-dimensional and wherein said three-dimensional data include data defining, for each of said constituent elements, a second normal vector which is normal to the plane of said each constituent element, further comprising:

scalar product calculation means for calculating the scalar product of said first normal vector and a second normal vector of a constituent element for which interference with respect to said working region has been found; and surface judgement means for judging, based on a calculation result obtained by said scalar product calculation means, whether said constituent element represents part of a front surface or a rear surface of said object.

8. A three-dimensional data shaping apparatus according to claim 7, wherein said shape change means is controlled in accordance with decisions made by said surface judgement means, to execute said shaped changes only on respective ones of said constituent elements which are judged to be part of a predetermined one of said front surface and rear surface, which correspond to one of said small regions for which interference with respect to said working region has been found by said first judgement means, and for which interference with respect to said working region has been found by said second judgement means.

9. A three-dimensional data shaping apparatus for processing three-dimensional shape data which represent a shape of an object in relation to a reference three-dimensional space, to execute a predetermined shaping operation, said three-dimensional shape data representing said shape as a plurality of constituent elements, said apparatus comprising:

input means for generating working region position data, operable for controllably varying said working region position data;

working region determining means for generating working region data representing a working region as a specific region within said reference three-dimensional space, responsive to said working region position data for controlling at least the position of said working region within said reference three-dimensional space;

processing means for determining respective position correspondences between said constituent elements and a plurality of small regions of said reference three-dimensional space;

memory means for storing data expressing said position correspondences;

first interference judgement means for judging for each of said small regions, based on said working region data and said position correspondences, whether there is interference between said small region and said working region;

second interference judgement means for judging, for each of said small regions for which interference with respect to said working region is found by said first interference judgement means, whether there is interference between said working region and at least one of said constituent elements which corresponds to said each small region; and shape change means for operating on said three dimensional shape data in accordance with said shaping operation, to change respective shapes of each of said constituent elements for which interference with respect to said working region is found by said second interference judgement means, further comprising selection means controllable for selecting an arbitrary set of said small regions within said three-dimensional space;

wherein said first interference judgement means executes judgement of interference only between said working region and small regions within said selected set.

10. A three-dimensional data shaping apparatus according to claim 9, wherein respective locations in said memory means are preassigned as respective flags for each of said small regions, wherein said selection means defines a cell region as a specific region within said three-dimensional space, wherein said selection means acts to set to a predetermined state respective flags of each of said small regions which at least partially overlap with said cell region within said three-dimensional space, and wherein said first judgement means is controlled to execute said interference judgement with respect to said working region only for respective ones of said small regions for which a corresponding one of said flags is set to said predetermined state.

11. A three-dimensional data shaping apparatus according to claim 9, wherein respective locations in said memory means are preassigned as respective first flags for each of said small regions, wherein said selection means defines a cell region as a specific region within said three-dimensional space, wherein said selection means acts to set to a predetermined state respective first flags of each of said small regions which at least partially overlap with said cell region within said three-dimensional space, wherein said first judgement means is controlled to execute said interference judgement with respect to said working region only for respective ones of said small regions for which a corresponding one of said first flags is set to said predetermined state, wherein respective locations in said memory means are preassigned as respective second flags for each of said small regions, wherein said processing means is responsive to said first interference judgement means for setting a second flag of a small region to said predetermined state when interference is found between said small region and said working region, and wherein said second judgement means is controlled to judge interference only between said working region and respective ones of said constituent elements which correspond to a small region for which a corresponding one of said second flags has been set to said predetermined state.

12. A three-dimensional data shaping apparatus according to claim 9, wherein said processing means executes respective specific amounts of displacement of all of said constituent elements corresponding to said said selected set of small regions, prior to execution of judgement of interference between said small regions and said working region by said first judgement means.

13. A three-dimensional data shaping apparatus according to claim 12, wherein said specific amounts of displacement are predetermined to result in displacement, to a substantially central region of said reference three-dimensional space, of a part of said work body represented by said constituent elements corresponding to the selected set of small regions, and to result in an expansion in size of said part of the work body.

14. A three-dimensional data shaping apparatus according to claim 9, wherein said apparatus further is selectively operable in a first mode of operation in which said selection means is responsive to said position data from said input means for determining the position of said cell region within said three-dimensional space and a second mode of operation in which said working region determining means is responsive to said position data for determining the position of said working region within said three-dimensional space.

15. A three-dimensional data shaping apparatus for processing three-dimensional shape data which represent a shape of an object in relation to a reference three-dimensional space, to execute a predetermined shaping operation, said three-dimensional shape data representing the surface of said object as a plurality of two-dimensional constituent elements, said apparatus comprising:

mode selection means, controllable for selectively designating a region specifying mode and a shaping mode of operation of said apparatus;

memory means for storing respective flags corresponding to each of said two-dimensional constituent elements;

input means, functioning in said region designating mode of operation to generate working region position data, and controllable for varying said working region position data;

working region determining means, functioning in said region designating mode of operation to generate working region data representing a working region as a specific region within said reference three-dimensional space, responsive to said working region position data for controlling the position of said working region within said reference three-dimensional space;

processing means for determining respective position correspondences between said two-dimensional constituent elements and a plurality of small regions of said reference three-dimensional space, said correspondences being stored as data in said memory means;

first interference judgement means functioning in said region specifying mode of operation to judge for each of said small regions, based on said working region data and said position correspondences, whether there is interference between said small region and said working region;

second interference judgement means functioning in said region specifying mode to judge, for each of said small regions for which interference with respect to said working region is found by said first interference judgement means, whether there is interference between said working region and at least one of said two-dimensional constituent elements which corresponds to said each small region, and for setting to a predetermined state the corresponding one of said flags if said interference is found; and shape change means functioning in said shaping mode to operate on said three-dimensional shape data in accordance with said shaping operation, to change respective shapes of each of said two-dimensional constituent elements for which a corresponding one of said flags has been set to said predetermined state.

16. A three-dimensional data shaping apparatus for processing three-dimensional shape data which express respective shapes of a plurality of objects in relationship to a reference three-dimensional space, said three-dimensional shape data representing at least the surface of a first object and the surface of a second object as a first set of two-dimensional constituent elements and a second set of two-dimensional constituent elements respectively, said apparatus comprising:

input means for generating position data, operable for controllably varying said position data and for selecting one of said first and second sets of two-dimensional constituent elements to be displaced within said three dimensional space in accordance with changes in said position data;

processing means for determining position correspondences between respective elements of said first set two-dimensional of constituent elements and second set of two-dimensional constituent elements and a plurality of small regions of said reference three-dimensional space, and responsive to said position data for processing said three-dimensional shape data to effect said displacement of said selected one of the first and second sets of two-dimensional constituent elements;

memory means for storing data expressing said position correspondences;

first interference judgement means for judging, based on said position correspondences, whether there is mutual interference between any of said small regions having elements of said first set of two-dimensional constituent elements corresponding thereto and any of said small regions having elements of said second set of two-dimensional constituent elements corresponding thereto; and second interference judgement means for judging, for each pair of said small regions for which mutual interference is found by said first interference judgement means, whether there is interference between any element of said first set of two-dimensional constituent elements which corresponds to a first small region of said pair and any element of said second set of two-dimensional constituent elements which corresponds to a second small region of said pair, and thereby judging whether there is interference between said first and second work objects.

17. A three-dimensional data shaping apparatus according to claim 16, further comprising display means responsive to said three-dimensional shape data for generating a display picture showing said first and second objects within said reference three-dimensional space.

18. A three-dimensional data shaping apparatus according to claim 17, wherein said display means is responsive to detection of interference between said first and second work objects for generating on said display picture an indication of occurrence of said interference.

19. A three-dimensional data shaping apparatus for processing three-dimensional shape data which express respective shapes of a plurality of objects in relationship to a reference three-dimensional space, said three-dimensional shape data representing at least the surface of a first object and the surface of a second object as a first set of two-dimensional constituent elements and a second set of two-dimensional constituent elements respectively, said apparatus comprising:

input means for generating position data, operable for controllably varying said position data;

working region determining means for generating working region data representing a working region as a specific region within said reference three-dimensional space, responsive to said working region position data for controlling the position of said working region within said reference three-dimensional space;

processing means for determining respective position correspondences between said two-dimensional constituent elements and a plurality of small regions of said reference three-dimensional space;

memory means for storing data expressing said position correspondences;

first interference judgement means for judging, based on said working region data and said position correspondences, for each of said small regions, whether there is interference between said small region and said working region;

second interference judgement means for judging, for each of said small regions for which interference with respect to said working region is found by said first interference judgement means, whether there is interference between said working region and at least one of said two-dimensional constituent elements which corresponds to said small region;

shape change means for operating on said three-dimensional shape data in accordance with said predetermined shaping operation, to change respective shapes of each of said two-dimensional constituent elements for which interference with respect to said working region is found by said second interference judgement means;

third interference judgement means for judging, based on said position correspondences, whether there is mutual interference between any of said small regions having two-dimensional constituent elements of said first set of two-dimensional constituent elements corresponding thereto and any of said small regions having two-dimensional constituent elements of said second set of two-dimensional constituent elements corresponding thereto; and fourth interference judgement means for judging, for each pair of said small regions for which mutual interference is found by said third interference judgement means, whether there is interference between any two-dimensional constituent element corresponding to a first small region of said pair and any two-dimensional constituent element which corresponds to a second small region of said pair, and thereby judging whether there is interference between said first and second work objects within said reference three-dimensional space.

20. A three-dimensional data shaping apparatus according to claim 19, further comprising display means responsive to said three-dimensional shape data and said working region data for generating a display picture showing said first and second objects and said working region respectively within said reference three-dimensional space.

21. A three-dimensional data shaping apparatus according to claim 20 wherein said display means is responsive to detection of interference between said first and second work objects for generating in said display picture an indication of occurrence of said interference.

* * * * *